United States Patent
Elango et al.

(10) Patent No.: US 12,481,500 B2
(45) Date of Patent: Nov. 25, 2025

(54) ACCELERATING LINEAR ALGEBRA KERNELS FOR ANY PROCESSOR ARCHITECTURE

(71) Applicant: NVIDIA Corporation, Santa Clara, CA (US)

(72) Inventors: Venmugil Elango, Kirkland, WA (US); Norm Rubin, Cambridge, MA (US); Mahesh Ravishankar, Kenmore, WA (US); Vinod K. Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/277,661

(22) Filed: Feb. 15, 2019

(65) Prior Publication Data
US 2019/0278593 A1    Sep. 12, 2019

Related U.S. Application Data

(60) Provisional application No. 62/641,121, filed on Mar. 9, 2018.

(51) Int. Cl.
*G06F 9/44* (2018.01)
*G06F 9/30* (2018.01)
*G06T 1/20* (2006.01)

(52) U.S. Cl.
CPC ........ *G06F 9/3001* (2013.01); *G06F 9/30065* (2013.01); *G06T 1/20* (2013.01)

(58) Field of Classification Search
CPC .................................................. G06F 9/30065
See application file for complete search history.

(56) References Cited

U.S. PATENT DOCUMENTS

| | | | |
|---|---|---|---|
| 5,832,272 A | 11/1998 | Kalantery | |
| 6,351,845 B1 | 2/2002 | Hinker et al. | |
| 7,386,844 B2 | 6/2008 | Heishi et al. | |
| 8,863,105 B2 | 10/2014 | Jie et al. | |
| 9,830,133 B1 | 11/2017 | Baskaran et al. | |
| 2002/0124012 A1* | 9/2002 | Liem | G06F 30/30 |
| 2003/0005419 A1* | 1/2003 | Pieper | G06F 8/4442 |
| | | | 717/141 |
| 2004/0237074 A1* | 11/2004 | Aronson | G06T 15/005 |
| | | | 717/158 |
| 2005/0197977 A1 | 9/2005 | Buck | |
| 2006/0015843 A1 | 1/2006 | Sabbouh | |

(Continued)

OTHER PUBLICATIONS

Cedric Bastoul, "Code Generation in the Polyhedral Model Is Easier Than You Think", 2004, pp. 1-10 (Year: 2004).*

(Continued)

*Primary Examiner* — Bradley A Teets
*Assistant Examiner* — Lanny N Ung
(74) *Attorney, Agent, or Firm* — Robert C. Kowert; Kowert, Hood, Munyon, Rankin & Goetzel, P.C.

(57) ABSTRACT

Systems and methods for obtaining a set of instructions for executing a computer program and generating executable code for the computer program based, at least in part, on scheduling operations associated with the executable code according to a polyhedral representation of a directed acyclic graph. The set of instructions may be represented as a domain-specific language. The executable code may be executable code for a specific processor architecture.

21 Claims, 9 Drawing Sheets

(56) References Cited

U.S. PATENT DOCUMENTS

| | | | |
|---|---|---|---|
| 2007/0079281 A1* | 4/2007 | Liao | G06F 8/45 717/106 |
| 2007/0294666 A1 | 12/2007 | Papakipos et al. | |
| 2008/0052676 A1 | 2/2008 | Wookey | |
| 2009/0083724 A1* | 3/2009 | Eichenberger | G06F 8/447 717/160 |
| 2009/0193402 A1* | 7/2009 | Bashkansky | G06F 8/443 717/145 |
| 2010/0106356 A1* | 4/2010 | Trepagnier | G05D 1/024 701/25 |
| 2010/0218196 A1* | 8/2010 | Leung | G06F 8/453 718/107 |
| 2014/0019949 A1* | 1/2014 | Craymer | G06F 8/456 717/150 |
| 2014/0165049 A1 | 6/2014 | Diamos | |
| 2014/0237459 A1* | 8/2014 | Von Platen | G06F 8/456 717/155 |
| 2016/0335120 A1* | 11/2016 | Gupta | G06F 9/5044 |
| 2018/0032117 A1 | 2/2018 | Leigh | |
| 2018/0083834 A1 | 3/2018 | Rani et al. | |
| 2018/0136912 A1 | 5/2018 | Venkataramani et al. | |
| 2018/0157471 A1* | 6/2018 | Venkataramani | G06F 8/4434 |
| 2021/0350234 A1 | 11/2021 | Yao et al. | |
| 2023/0251861 A1 | 8/2023 | Elango et al. | |

OTHER PUBLICATIONS

Michael Aram et al., "Multilayered analysis of co-development of business information systems", 2015, pp. 1-30 (Year: 2015).*

Ian Bertolacci et al., "Identifying and Scheduling Loop Chains Using Directives", 2016, pp. 57-67 (Year: 2016).*

Uday Kumar Reddy Bondhugula, "Effective Automatic Parallelization and Locality Optimization Using The Polyhedral Model", 2008. (Year: 2008).*

Arie van Deursen et al., Domain-Specific Languges: An Annotated Bibliography, Jun. 2000 (Year: 2000).*

Gilles Duboscq et al., "Graal IR: An Extensible Declarative Intermediate Representation", Feb. 2013 (Year: 2013).*

Alias et al., "Optimizing Remote Accesses for Offloaded Kernels: Application to High-Level Synthesis for FPGA," Proceedings of the 17th ACM SIGPLAN Symposium on Principles and Practice of Parallel Programming (PPOP '12), Feb. 25, 2012, 2 pages.

Bondhugula et al., "PLuTo: A Practical and Fully Automatic Polyhedral Program Optimization System," Mar. 3, 2008, retreived Nov. 17, 2020, from http://citeseerx.ist.psu.edu/viewdoc/download doi=10.1.1.151.2361&rep=rep1&type=pdf, 15 pages.

Darte et al., "Scheduling Uniform Loop Nests," Sep. 25, 1996, retrieved Jul. 31, 2020, http://citeseerx.ist.psu.edu/viewdoc/download?doi=10.1.1.53.3163&rep=rep1&type=pdf, 26 pages.

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Jordans, "The polyhedral model," retrieved Jul. 31, 2020, from http://www.es.ele.tue.nl/~rjordans/5LIM0/10-polyhedral-model.pdf, 28 pages.

Moshovos et al., "Read-After-Read Memory Dependence Prediction," Proceedings of the 32nd Annual ACM/IEEE International Symposium on Microarchitecture (MICRO 32), Nov. 16, 1999, pp. 177-185.

"NNVM Compiler: Open Compiler for AI Frameworks," Apache TVM, https://tvm.apache.org/2017/10/06/nnvm-mpiler-announcement, Oct. 6, 2017, 3 pages.

PyTorch, http://pytorch.org/, http://pytorch.org/>retrieved Jun. 2, 2020, 2 pages.

Al-Rfou et al., "et al., Theano: A Python framework for fast computation of mathematical expressions", Theano Development Team, https:/Jarxiv.org/abs/1605.02688, 2016, pp. 1-19.

Anderson et al., "LAPACK Users' Guide—Third Edition", Society for Industrial and Applied Mathematics, www.http://www/hetlib.org/lapack/lug/, 1999, 5 pages.

CuPY, "CuPy—NumPy-like API accelerated with CUDA", https://docs-cupy.chainer.org/en/stable/index.html, Retrieved on Apr. 24, 2020, 2 pages.

Google, "Google Developers Blog: XLA—TensorFlow, compiled", https://developers.googleblog.com/2017/03/xla-tensorflow-compiled.html, Mar. 6, 2017, 6 pages.

Hains et al., "Parallel Functional Programming with Arrays," The Computer Journal, Cambridge University Press, 1993, 21 pages.

Harris et al., "GPU Gems 3, Chapter 39 : Parallel Prefix Sum (Scan) with CUDA", https://developer.nvidia.com/gpugems/GPUGems3/gpugems3_ch39.html, retrieved Apr. 24, 2020, 13 pages.

Kristensen et al., "Bohrium: Unmodified NumPy Code on CPU, GPU and Cluster", http://hiperfit.dk/pdf/Bohrium.pdf Nov. 2013, 8 pages.

Leary et al., YouTube video "XLA: TensorFlow, Compiled! (TensorFlow Dev Summit 2017)," at https://www.youtube.m/watch?v=kAOanJczHA0, Feb. 15, 2017, 3 pages.

Lutz et al., "LambdaJIT: A Dynamic Compiler for Heterogeneous Optimizations of STL Algorithms", http://dx.doi.org/10.1145/2636228.2636233, In Proceedings of the 3rd ACM SIGPLAN Workshop on Functional High-performance Computing, Sep. 4, 2014, pp. 99-108.

NumPy.org, "Broadcasting," NumPy v 1.18 Manual—NumPy User Guide, https://numpy.org/doc/stable/user/basics.broadcasting.html, retrieved Jun. 2, 2020, 5 pages.

NVIDIA Corporation, "Cublas Library", http://docs.nvidia.com/cuda/cublas/index.html, DU-06702-001_v10.2, Nov. 2019, pp. 1-249.

NVIDIA Corporation, "Cuda C++ Programming Guide", https://docs.nvidia.com/cuda/cuda-c-programming-guide/ndex.html, PG-02829-001_v10.2, Nov. 2019, 346 pages.

Van Der Walt et al., "The NumPy Array: A Structure for Efficient Numerical Computation", Computing in Science Engineering, vol. 13, 2011, pp. 22-30.

Yalamanchili et al., "ArrayFire—A high performance software library for parallel computing with an easy-to-use API", AccelerEyes, http://arrayfire.org/docs/index.htm, retrieved on Jun. 2, 2020, 3 pages.

Verdoolaege, "ISL: An Integer Set Library for the Polyhedral Model," In Mathematical Software, Sep. 15, 2010, 149 pages.

Geeks3D, "What is a Texture Processor Cluster or TPC," https://www.geeks3d.com/20100318/tips-what-is-a-texture-processor-cluste-or-tpc/, Mar. 2010, pp. 1-8.

Gpuhwkepler, Compute/Application Performance/Applications/Linear Algebra/GEMM/GEMM for Dummies, retrieved from <https://wiki.nvidia.com/gpuhwkepler/index.php/Compute/Application_Performance/Applications/Linear_Algebra/GEMM/GEMM_for_Dummies>, 2020, 39 pages.

Ryan Smith, "NVIDIA's GF100: Architected for Gaming", https://www.anandtech.com/show/2918/2, Jan. 2010, 8 pages.

* cited by examiner

ACCELERATING LINEAR ALGEBRA KERNELS FOR ANY PROCESSOR ARCHITECTURE

CROSS-REFERENCE TO RELATED APPLICATIONS

This application claims priority under 35 U.S.C. § 119(e) from and incorporates by reference for all purposes the full disclosure of U.S. Provisional Application Ser. No. 62/641,121 entitled "A SYSTEM AND METHOD FOR EXPRESSING AND COMPILING LINEAR ALGEBRA KERNELS" filed on Mar. 9, 2018.

BACKGROUND

Graphics Processing Units (GPUs) play a major role in scientific computations, and in neural network training and inference. Regular computational structure of scientific computing codes makes general-purpose GPUs (GPGPUs) a good fit to perform these computations with high efficiency and low energy. Matrix-matrix multiplication and many other linear algebra computations form the basis for several scientific computation and neural network algorithms. Hence, having efficient implementations of basic linear algebra computations for different GPU architectures is critical for the overall performance.

However, there are many challenges surrounding evolving architectures, and high performing linear algebra kernels have to be written and tuned for each current and upcoming GPUs. It is becoming increasingly difficult for programmers and researchers is to manually write these kernels for each individual architecture in GPU's assembly-level language (SASS), and hand tune them for improved performance. This involves significant and continuous manual effort.

In addition, scientific computation codes are generally composed of various sub-computations in different combinations. For example, training a neural network involves performing a matrix-multiplication, followed by adding a bias, and applying an activation function. There are an impractical number of possible combinations of sub-computational sequences to be optimized, making it impractical to manually write and hand-tune all possible combinations. Further, there are several scenarios (including machine-learning) in which it is important to specialize implementation of these kernels for specific problem sizes. Accordingly, there are many challenges surrounding how to efficiently generate kernels for these computations.

BRIEF DESCRIPTION OF THE DRAWINGS

Various techniques will be described with reference to the drawings, in which.

DETAILED DESCRIPTION

Figure 1:
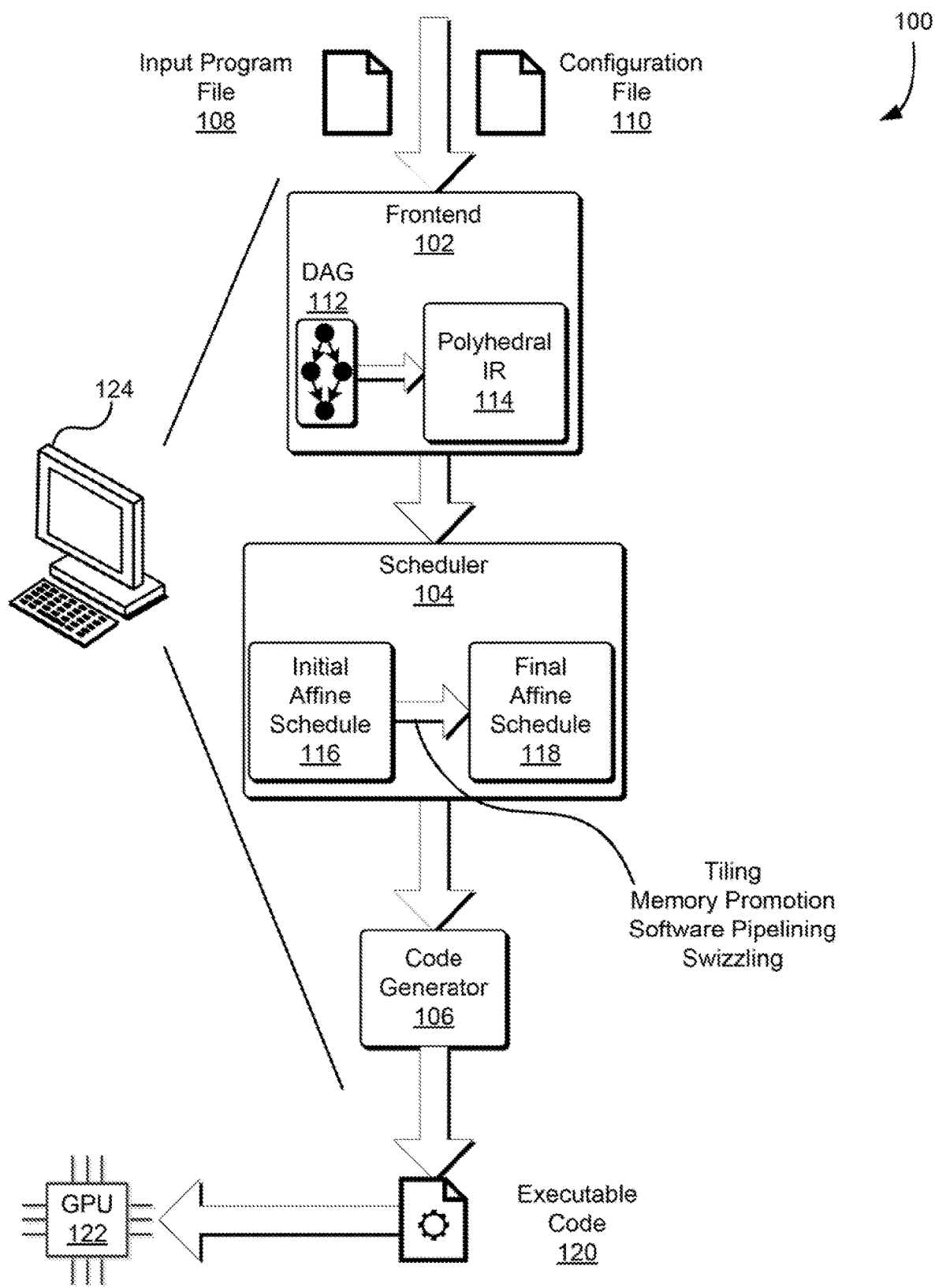
FIG. 1 illustrates a computing environment in which a domain-specific language (DSL) compiler is implemented, in accordance with one embodiment.

In an embodiment, a domain-specific language (DSL) refers to a computer language or programming language having a limited purpose and may have a limited expressiveness with regard to the types of operations supported by the DSL. In an embodiment, a DSL is a non-Turing-complete language. A domain-specific language may be described in contrast to a general-purpose language (GPL) which is broadly applicable across application domains and lacks specialized features for a particular domain. Examples of GPLs include general-purpose markup languages such as XML, general-purpose modeling languages such as the Unified Modeling Language (UML), and general-purpose programming languages such as C++, Java, PHP, and Python. In an embodiment, a domain-specific language has a syntax or grammar that includes various types of primitives such as declarations, statements, and specific calls such as a function call for code generation. In an embodiment, the term "CodeGen" is used to describe an operation that causes generation of optimized code, such as in accordance with techniques described in connection with FIG. 4 but other suitable terms to reference such an operation are also contemplated as being within the scope of this disclosure as specific examples (e.g., "CodeGen" function) are merely illustrative in nature. In an embodiment, lists of input and output matrices are declared at the beginning of a DSL input file. In an embodiment, the input matrix dimension sizes are specified in the matrix declaration. In an embodiment, the dimensions of output matrices are automatically derived or calculated from the matrix dimension sizes of the input matrices and are not required to be specified by a user. In an embodiment, declarations are followed by sequences o expressions composed of matrix operations. In an embodiment, expression are described in a static single assignment (SSA) format wherein each matrix can appear at most once in the left-hand side of assignment operators. In an embodiment, various operations are supported by the DSL. In an embodiment, supported arithmetic operations include one or more of the following: addition (+), which may refer to pointwise addition of matrix elements; subtraction (-), which may refer to pointwise subtraction of matrix elements; multiplication(*), which may refer to multiplication of two matrices. In an embodiment, the DSL supports assignment (=) and transposition operations (^T). In an embodiment, various parameters required for code generation are specified; these elements may include, for example: element ty of the matrices, list of output matrices; operational prefix for the filename of the generated files; and any suitable combination thereof. In an embodiment, if no filename prefix is specified, the files are generated with a default prefix.

In an embodiment, the DSL input file can be configured to specify various parameters such as tile sizes; various configurations can be configured with default values. In an embodiment, one or more of the following parameters are configurable and/or have default values if not configured: warpsize (default=32); shared memory bank size (default=32); warp level tilesizes, thread level tilesizes; vector size for global memory loads and stores (default=2); vector size for shared memory loads and stores (default=4); swizzling support (default =supported); swizzling bit pattern; unrolling support (default=supported); block-cyclic distribution (default=supported); and any suitable combination thereof.

In an embodiment, an input or expression file is encoded based on the following:
Matrix A (512 ,512);
Matrix B (512 ,512);
Matrix C;
Matrix D;
C=A*B;
D=C+A;
CodeGen (float32 , {C, D}, ex1);

In an embodiment, a configuration file is encoded based on the following:
WarpSize <32>
SharedBankSize <32>
BlockTile <8 ,8 ,8>
WarpTile <4 ,8>
ThreadTile <8 ,8 ,1>
GlobalVectorSize <2>
SharedVectorSize <4>
SwizzleBits <0 ,1>
Unroll <1>

The DSL is invoked, in an embodiment, with an expressions file and configuration file using any suitable syntax. In an embodiment, the following command invokes a DSL:
>la__dsl <expressions__file> <config_file>

As a result, in an embodiment, three output files are generated, a host file, a device file, and a header file, which may be in the following format:

```
<prefix>_host.cu
<prefix>_device.cu
<prefix>.h
``` wherein the <prefix> placeholder refers to the filename prefixed described above, in accordance with one embodiment. In an embodiment, an expression file and configuration file are implemented in connection with FIG. 1.

In an embodiment, computer systems described throughout this disclosure utilize polyhedral compilation techniques which are applicable to at least a sub-class of code or executable routines called static control parts (SCoPs). In an embodiment, a part of a program is identifiable as a SCoP if it meets certain requirements: first, any iterative loops such as FOR-loops include constant strides, and conditional statements (e.g., IF-ELSE conditions, ternary operators) whose conditional express and loop bound expressions are affine functions of program parameters and surrounding loop induction variables. The stride of a loop, in an embodiment, refers to the distance in memory of data access by successive iterations of a loop. In an embodiment, array access functions of the statements are expressible as affine functions of program parameters and surrounding loop induction variables. In an embodiment, linear algebra computations are SCoPs. In an embodiment, a polyhedral model captures the execution of SCoPs in a compact form as sets and relations. In an embodiment, ISL terminology may be used to describe the sets and relations.

An iteration domain may refer to a compact representation of statement instances of a SCoP statement. In an embodiment, the set of all iteration vectors of a statement S is the iteration domain of S. As an illustrative example, consider the following matrix-matrix multiplication:
for (i=0; i<N; i++)
    for (j=0; j<N; j++)
        for (k=0; k<N; k++)
            S1: C[i][j]+=A[i][k]*B[k][j];

The iteration domain of the statement S1 as described above, which is denoted as $D_{S1}$, is given by $[N] \rightarrow \{S1[i,j,k]:0 \le i,j,k<N\}$ wherein the left-hand side of the arrow operator→refers to a list of parameters that defines the set; the space in which the set lives in is denoted by S1 [ . . . ]; the points belonging to the set are specified using the Presburger formulae shown to the right of the colon : thereby modeling union of integer polyhedrons.

In an embodiment, access functions map statement instances to memory locations from where data is read from or written to. In an embodiment, for a polyhedral model, access functions are represented by affine maps from iteration domain to data sets. In an embodiment, such as those in connection to the matrix-matrix multiplication described above, read from array A is given by the map $[N] \rightarrow \{S1[i,j,k] \rightarrow A[i, k]:0 \le i,j,k<N\}$.

In an embodiment, the order in which statement instances are to be executed is defined by a schedule which may be encoded as a schedule file. In an embodiment, a schedule is an affine schedule $S_S$ for a statement S is an affine map that assigns a multi-dimensional integer value to each instance of S. In an embodiment, an affine schedule is in accordance with those described in connection with "Scheduling Uniform Loop Nests" to Darte and Robert, which is hereby incorporated by reference. In an embodiment, a statement instance $s_1$ of S is executed before an instance $s_2$ if the value $v_1$ assigned by $S_s$ to $s_1$ is lexicographically smaller than the value $v_2$ assigned to $s_2$. In an embodiment, the affine schedule corresponding to the execution order provided by the code segment of the matrix-matrix multiplication described above for statement S1 is given by $S_{S1}:=[N] \rightarrow \{S1[i,j,k] \rightarrow [i,j,k]:0 \le i,j,k<N\}$.

In an embodiment, a schedule specifies a relative or absolute timestamp for each point (e.g., iteration vector) in the iteration domain. In an embodiment, affine schedules are interpreted as a set of hyperplanes—for the matrix-matrix multiplication described above, the set of hyperplanes for the schedule $S_{S1}$ is given by $\{(1, 0, 0), (0, 1, 0), (0, 0, 1)\}$, which corresponds to the range [i,j,k] of $S_{S1}$. In an embodiment, a code generate generates appropriate loop nests, corresponding to an affine schedule, using the aforementioned hyperplane directions and the bounds on the iteration domain.

In an embodiment, dependencies between iteration points of a SCoP are derived from its corresponding schedule and access functions. In an embodiment, and in accordance with the matrix-matrix multiplication described above, both the read and write accesses of statement S1 to array C are given by: $R_{S1,C}:=W_{S1,C}:=[N] \rightarrow \{S1[i, j, k] \rightarrow C[i, j]:0 \le i, j, k<N\}$. In an embodiment, read-after-write (RAW) dependence $P^{RW}_{S1}:=[N] \rightarrow \{S1[i, j, k] \rightarrow S1[i, j, k +1]:0 \le i,j<N \wedge 0 \le k<N-1\}$ is derived from the schedule $S_{S1}$, and the relations $R_{S1,C}$ and $W_{S1,C}$. In an embodiment, determining a polyhedral optimization involves determining an optimal schedule for execution under a given objective such as maximizing parallelism, minimizing data movement, etc. In an embodiment, a polyhedral optimization involves determining a sub-optimal such as a schedule that exceeds a threshold level of parallelism or falls below a threshold level of data movement and so forth. In an embodiment, data dependencies play an important role by constraining the possible schedules that are derivable. Valid schedules S for a statement respect RAW, WAW, and WAR dependencies. In an embodiment, if an iteration vector $v_1$ has a RAW dependence on vector $v_2$, then $S(v_1)<S(v_2)$ where < denotes lexicographical order. In an embodiment, a read-after-read (RAR) dependency indicates reuse of data which is utilized in finding schedules that improve data locality.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including improving operation of processing units of a computer by generating executable code that causes the processors to more efficiently utilize computing resources such as registers and higher-level caches.

FIG. 1 illustrates a computing environment 100 in which a DSL compiler is implemented. In an embodiment, the DSL compiler comprises three components: a frontend 102 that parses the input program, and converts the program into its polyhedral representation; a scheduler 104 that computes an efficient computation schedule corresponding to the input program for the target GPU; and a code generator 106 that generates device functions from the schedule computed by the scheduler.

In an embodiment, the frontend 102 accepts an input program file 108 from a user and converts it into an equivalent polyhedral intermediate representation (IR), which is then passed to the scheduler 104 for optimization. An equivalent polyhedral IR, in an embodiment, refers to any suitable polyhedral representation generated from a directed acyclic graph of the input program wherein the DAG includes nodes that correspond to operators and operands of the input program. In an embodiment, the frontend 102 also accepts a configuration file 110 which specifies a set of parameters for determining how to process the input file to determine a schedule. In an embodiment, the DSL supports an intuitive syntax to represent linear algebra expressions comprising a series of operations that include general matrix-matrix multiplication (GEMM), matrix addition, and more. In an embodiment, the frontend 102, as part of converting the input program to a polyhedral representation, the DSL constructs an expression directed acyclic graph (DAG) 112 where nodes represent linear algebra primitives such as variables and operators. In an embodiment, dependencies are captured by the directed edges between nodes. In an embodiment, each node is associated with an affine set, called dataset, and an affine map, called datamap. In an embodiment, the frontend 102 is implemented in any suitable manner including as a software module of a computer system. In an embodiment, the frontend 102 accepts the input program file and the configuration file via an application programming interface (API) command.

In an embodiment, each node of the DAG has an associated affine set called dataset, that contains the information about the space needed to hold its data—a node corresponding to an input matrix Matrix A(M,K) has an associated dataset $[M, K] \to \{A[i,j]: 0 <= i < M$ and $0 \leq j < K\}$, which is a two-dimensional set with each dimension constrained by the matrix size. In an embodiment, dimensionality and sizes of the datasets for input nodes are obtained from declarations specified by the user. In an embodiment, the datasizes of remaining nodes in a DAG are derived using predefined rules.

In an embodiment, datamaps are affine functions that capture data layout information of datasets. For instance and in an embodiment, Matrix A may have a dataset $\{A[i,j]: 0<=i<128$ and $0<=j<64\}$. In an embodiment, the datamap can be used to determine whether different expreessios can share the same address space—for example matrix A and the transpose of the matrix A^T semantically indicates that the elements of matrix A are just reordered to their transposed locations, without any change in their values so both expressions A and $A^T$ can share the same physical memory space using the datamap $\{A^T[i,j] \to A[j,i]:\}$, representing transpose DLT. In an embodiment, datamap of all types of nodes, except transpose (^) node, is an identity map from its dataset to itself. Datamap for transpose node $$N_1[N_2[E_1]^T := M(N_2) \circ \{M\_1[i, j] \text{->} M\_2[j, i]:\}$$

In an embodiment, the frontend 102 is configured with executable code for extracting the polyhedral IR 114 of the input program by building iteration domains, access functions, and data dependence relations corresponding to the expressions. In an embodiment, the iteration domain and data dependence information is required to find a valid schedule for the computation, while access functions are needed for data layout transformations, and memory promotions.

In an embodiment, iteration domains of different nodes live in different set-spaces, and are identified by their space names. In an embodiment, the iteration domain of various operations is defined using domain-specific knowledge or rules. A domain-specific language may be described in contrast to a general-purpose language (GPL) which is broadly applicable across application domains and lacks specialized features for a particular domain. Examples of GPLs include general-purpose markup languages such as XML, general-purpose modeling languages such as the Unified Modeling Language (UML), and general-purpose programming languages such as C++, Java, PHP, and Python. In an embodiment, each operation is associated with two access maps—read, and write access maps wherein read maps capture read information of an operation by relating its iteration domain points to datasets of its operands, while write maps are used to capture write information by relating iteration domain points to its own dataset. In an embodiment, aliases between datasets for the operands are resolved with the help of datamaps.

The scheduler 104 illustrated in FIG. 1 is implemented using hardware, software, or a combination thereof. In an embodiment, the scheduler uses ISL's implementation of PLuTo scheduling algorithm to obtain an initial affine schedule 116. In an embodiment, multiple loop nests are fused if and only if fusing them doesn't lead to loss of parallelism.

In an embodiment, the scheduler applies a sequence of optimizations to the initial affine schedule that was obtained, which may include one or more of the following: tiling; memory promotion; software pipelining; and more. Tiling serves the dual purpose of improving data locality, and enabling distribution of workload to thread and thread blocks, in an embodiment. In an embodiment, efficient memory promotion is achieved by distributing parallel loops in a block-cyclic fashion. In an embodiment, memory promotion refers to utilization of memory in which different threads within a threadblock share data through shared memory whose latency is lower than global memory. In an embodiment, a GPU's shared memory is software managed.

In an embodiment, the final affine schedule 118, after application of several transformations is represented in the form of a schedule tree and a device function is created by the code generator corresponding to each high-level loop nest where grid sizes and threadblock sizes are derived by analyzing the bounds of parallel schedule dimensions that are marked to be distributed. In an embodiment, during code generation by the code generator 106, the loops that are marked for distribution are replaced with appropriate CUDA variables (such as blockIdx.y, etc), and the remaining loops and statements are printed within body of the device function. Diesel also generates a driver function that could be called by the user to run the sequence of device functions. In an embodiment, the resulting output is executable code 120 that is executable according to one or more processor architectures. In an embodiment, the executable code 120 includes instructions that, as a result of execution by a computer system comprising a GPU 122, causes the computer system to run the input program with the application of one or more optimizations that improves the efficiency of the operation. In an embodiment, a computer system 124 implements any suitable combination of the frontend 102, scheduler 104, and code generator 106, which may be software modules of a software application. In an embodiment, the computer system 124 comprises the GPU 122. In an embodiment, the GPU 122 is a component of the computer system 124. In an embodiment, the GPU 122 is a processor of another computing entity. In an embodiment, the GPU 122 is a processor (e.g., a general use processing unit) and the executable code 120 includes optimized linear algebra kernels that, if executed by the GPU at least in part, controls an autonomous vehicle such as a drone, self-driving vehicle such as an automobile, unmanned aerial vehicle (UAV), and more. In an embodiment, the executable code 120 implements a machine-learning or deep learning software program or algorithm that includes the performance of one or more matrix multiplication operations which are accelerated through execution on the GPU 122.

Figure 2:
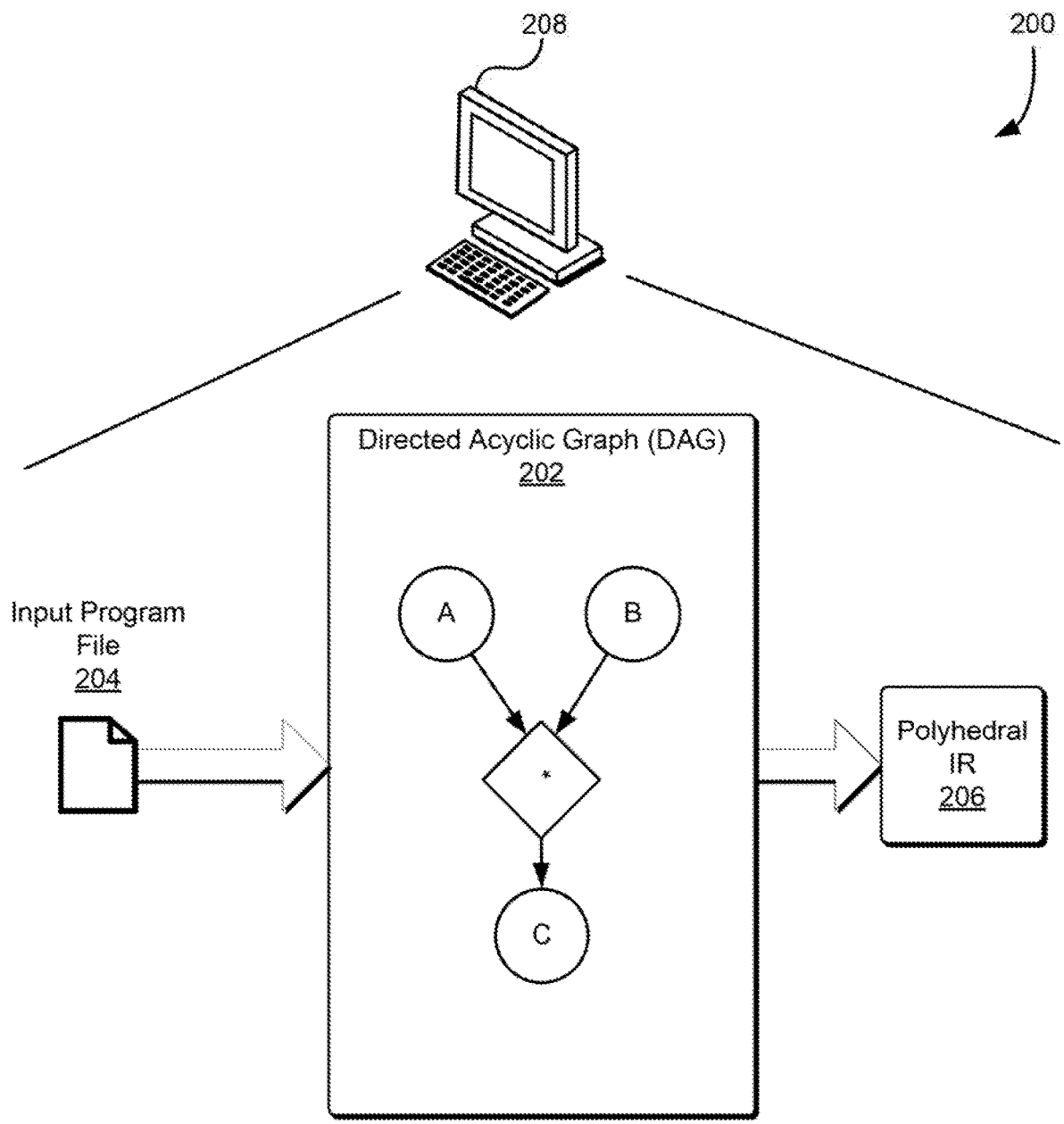
FIG. 2 illustrates a computing environment in which a program is implemented according to techniques described here to generate optimized executable code, in accordance with one embodiment.

FIG. 2 illustrates a computing environment 200 in which a program is implemented according to techniques described here to generate optimized executable code. In an embodiment, a directed acyclic graph 202 is generated from an input program file 204 and the DAG is used to generate a polyhedral IR 206 of the input program.

In an embodiment, the program is written in a domain-specific language that describes a high-level matrix multiplication operation. In an embodiment, the DSL is described based on or in the following manner:

Matrix A (1024 ,1024);
Matrix B (1024 ,1024);
C=A*B;
CodeGen (FLOAT , {A, B, C}, {C}, sgemm);

In an embodiment, the operations above are encoded in an input program file 204 and a configuration file can be specified that provides a set of parameters for determining how to process the input file to determine a schedule and, from the schedule, computer-executable instructions according to a processor architecture. In an embodiment, a suitable system uses a parser to cover the high-level representation to a DAG 202. In an embodiment, nodes of the DAG represent operators, variables, and other linear algebra primitives. In accordance with FIG. 2 and in an embodiment, the circles represent data matrices and the diamonds correspond to operations. In an embodiment, the DAG is used to determine where intermediate results are needed and to calculate the size of those intermediates.

In an embodiment, the parser constructs that DAG and a table lookup of operations is used to convert the DAG to a set of equations in polyhedral form as a polyhedral IR 206. As a point of comparison, an un-optimized CPU implementation of the above code, in an embodiment, might be:

```
for (i = 0; i < 1024 i ++){
    for (j = 0; j < 1024; j ++){
        C[i][j] = 0;
        for (k = 0; k < 1024; k ++){
            C[i][j] += A[i][k] * B[k][j]
        }
    }
}
```

In an embodiment, a polyhedral compiler begins by considering the iteration space that represents the set of possible statement instances, such as the range of the indices i, j, and k in the range of 0<=i,j,k<1024. In an embodiment, the polyhedral compiler then finds the dependencies among iterations— in this case, there is a dependence carried by the k loop since each C [i] [j] depends on the value in the previous iteration. In an embodiment, the operation in the inner loop comprises of loads A and B and fused multiply add (FMA) operations as well as assorted loop control statements. In an embodiment, polyhedral methods are used to perform various optimizations to reorder the loops, add tiling, apply fusion, spit the loops up and introduce shared memory, and more. In an embodiment, the code is reshaped to add more loops so that outer block level loops which have no dependence and can be mapped directly to the parallel execution of GPU blocks, per warp loops, and per thread loops.

In an embodiment, the computation (e.g., matrix multiplication) is split into tiles having tilesizes specified by the configuration file (e.g., 8×8 tiles). In an embodiment, a tile having an 8×8 size is computed by reading 8 elements of a first matrix and 8 elements of a second matrix to combine them into 64 accumulated sums. In an embodiment, as the loops get formed, the DSL does unrolling using the following code:

```
for each block ( ) {
    // Copy a tile of A and B from global mem to shared mem .
    // This is split into 2 phases .
    // 1) global -> private_buffer ; 2) private_buffer -> shared
    Load_A_Block (0);
    Load_B_Block (0);
    Store_A_Block ( );
    Store_B_Block ( );
```

```
        _syncthreads ( );
        // main loop
        for (int k = 0; k < 127; k++) {
                for each thread in warp {
                        // Prefetch data for next iteration from global to private buffer
                        Load_A_Block (k +1);
                        Load_B_Block (k +1);
                        for (kk = 0; kk < 8; kk ++) {
                                // Copy a col of A and a row of B from shared to private arrays
                                Load_A_Col ( );
                                Load_B_Row ( );
                                // Perform outer product
                                FMA (A_pvt , B_pvt , C_pvt );
                        }
                        _syncthreads ( );
                        // Store prefetched data from buffer to shared mem
                        Store_A_Block ( );
                        Store_B_Block ( );
                        _syncthreads ( );
                }
        } // end main loop processing tiles
        // Compute last tile
        for (kk = 0; kk < 8; kk ++) {
                // Copy a col of A and a row of B from shared to private arrays
                Load_A_Col ( );
                Load_B_Row ( );
                // Perform outer product
                FMA(A_pvt , B_pvt , C_pvt );
        }
        // write the output from private to global mem
        for each warp in the block {
                for each thread in warp {
                        Store_C ( );
                }
        }
}
```

In an embodiment, some polyhedral transformations are standard (e.g., in the sense that they are processor-agnostic and apply to various architectures) where as others make use of GPU specific features. In an embodiment, block sizes are specifiable by a user via a configuration file, allowing for a future auto tuner. In an embodiment, a table driven approach is used to map DAGs to loop nests. In an embodiment, the code is structured so that the outermost loops have no loop carried dependence so that they can be mapped to GPU threadblocks. In an embodiment, shared memory is supported. In an embodiment, parts of input matrices are fetched from global memory so that loads and FMAs can overlap In an embodiment, the code is swizzled to exploit hardware high-bandwidth patterns.

As part of a fourth step, and in an embodiment, the computation further includes two parts: outer chunk, and inner chunk (that is nested within the outer chunk) where outer chunk is distributed to different threadblocks, and the inner chunk is executed by each thread. In an embodiment, the inner chunk reads 8 values (e.g., as determined by the tilesize) from shared memory and computes the sums, which can be written using a series of loads, FMAs, and assorted loop controls. In an embodiment, the code is implemented in the following manner:

```
for (k = 0; k < 8 k ++){
        for (i = 0; i < 8; i ++){
                for (j = 0; j < 8; j ++){
                        C[i][j] += A[i][k] * B[k][j]
                }
        }
}
```

This code is, in an embodiment, computationally more efficient than the un-optimized CPU implementation described above. In an embodiment, unlike the outer chunk where the outermost loops should be parallel so that they can be distributed, at the inner chunk, we speed this up exchanging the loops so that the dependence is on the outermost loop and then to unroll the inner loops and the result is that at the outer level we get coarse-grained parallelism while we get fine-grain parallelism at the inner loops.

In an embodiment, the system remove the loop overhead by fully unrolling the code which results in a performance gain since the FMA operations can be overlapped and the loop control overhead eliminated, but accumulator values are kept in register to increase the amount of unrolling. In an embodiment, the tilesize is adjusted in the configuration file to get the most unrolling without spilling. Formally this transformation replaces the dot product inner loop with an outer (or as it is sometimes called tensor) product. Each k iteration does a reduction over matrices. After the transform the code needs to load a column of A's and a row of B's followed by an outer product of A ⊗ B giving 16 loads for 8 FMA operations. Notice that there is no dependence within each k iteration. So any order of the FMA operations produces the same numerical result but it turns out that some orders are faster than others.

In an embodiment, each set loads a set of a and b values from shared memory, wait for the loads to finish, and then applies generated FMA sequence. In an embodiment, if there were a lot of threads, hardware would fill the time waiting for loads to finish by running other threads. However, due to the amount of shared memory in use there may not be enough threads to cover the latency. In an embodiment, rather than using 8 registers to hold A and B slices, double-buffering techniques may be two sets of 8 are used to hold two slices so that they can be overlapped. In an embodiment, the a computer system 208 such as those described in connection determine a polyhedral form from the DAG.

Figure 3:
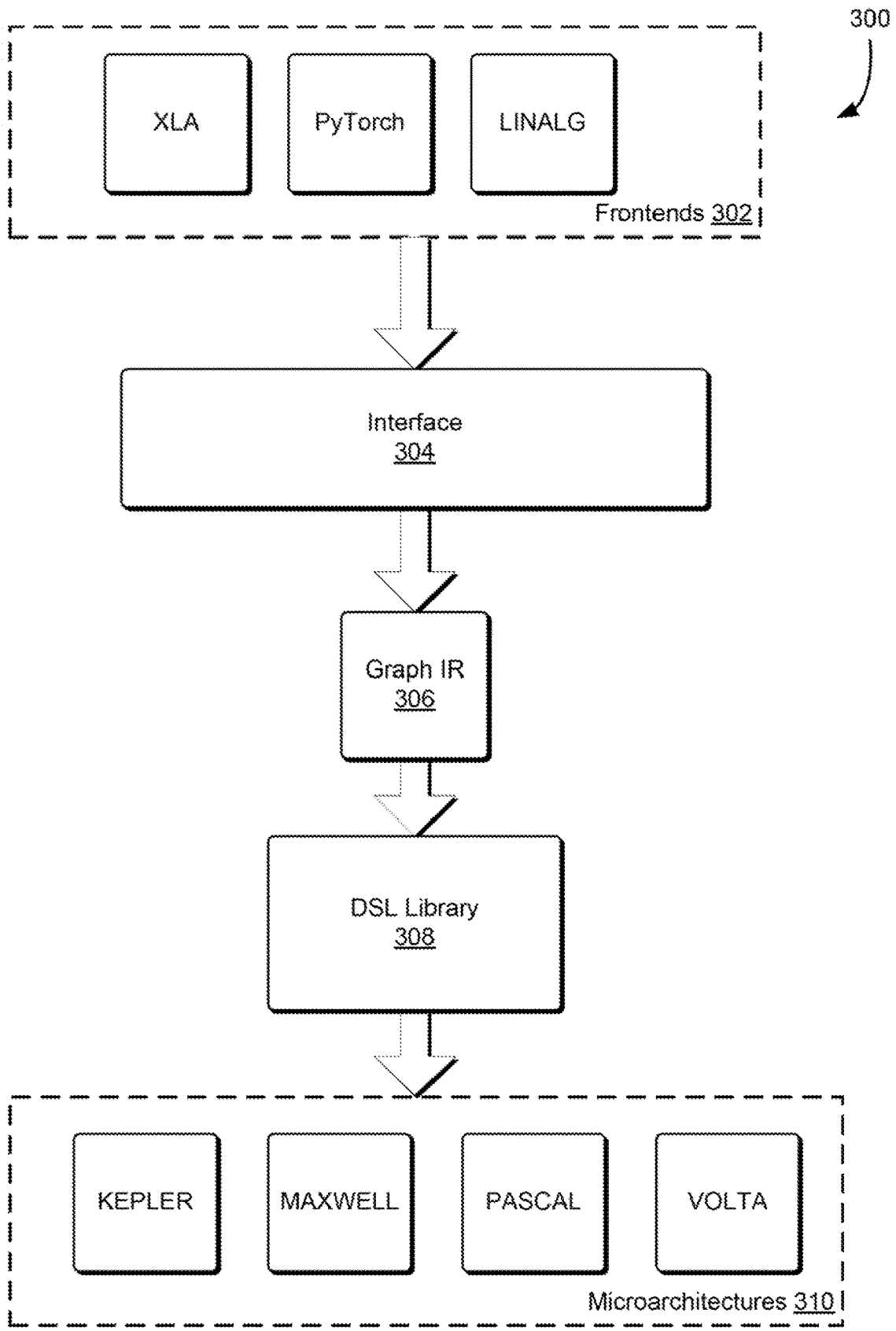
FIG. 3 illustrates a computing environment showing an architecture of the DSL compilation process, in accordance with one embodiment.

FIG. 3 illustrates a computing environment 300 showing an architecture of the DSL compilation process, in accordance with one embodiment. In an embodiment, the frontends 302 each accept input programs from the user via an interface 304 and converts them into an equivalent graph internal representation 306 which may be represented as directed nodes with operators and operands as the nodes. In an embodiment the graph IR 306 is provided to the DSL library 308 which is software that exposes a set of C APIs allowing other libraries to directly link to diesel to generate optimized GPU kernels. In an embodiment, the optimized GPU kernels are optimized to run on one more specific microarchitectures 310, each of which may support different types of hardware optimizations.

Figure 4:
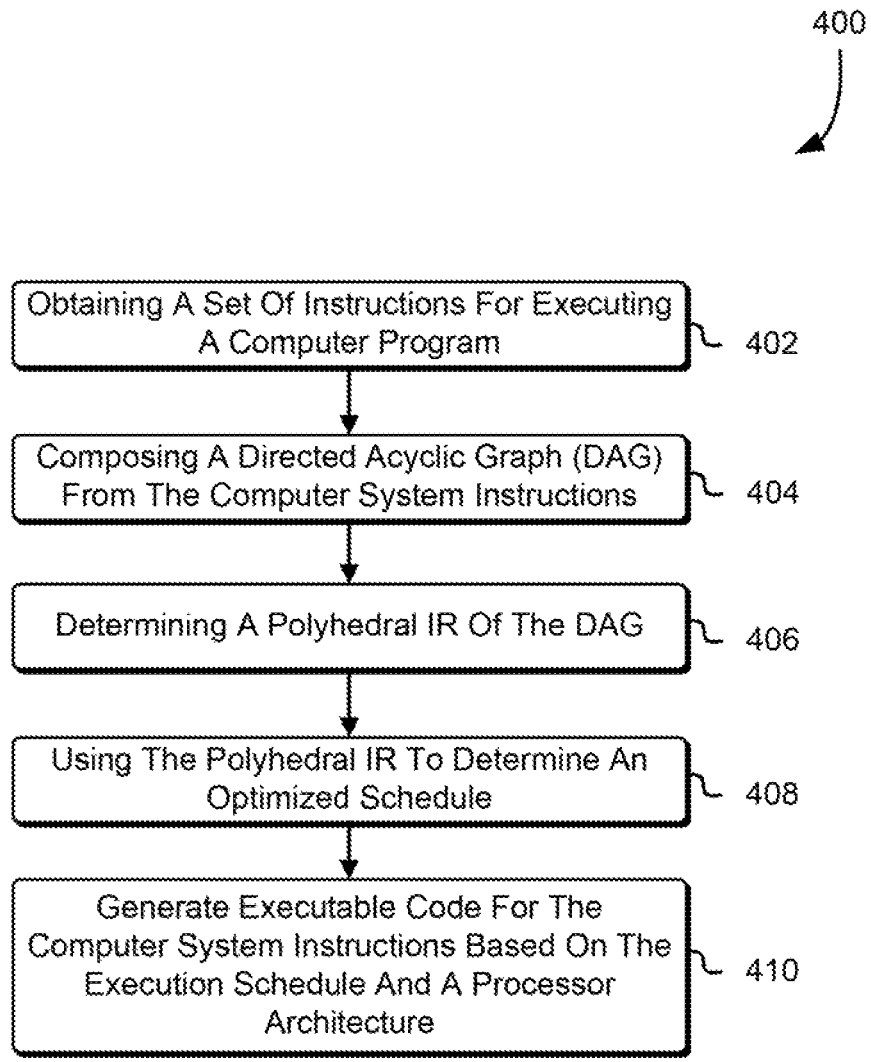
FIG. 4 shows an illustrative example of a process for generating optimized executable code, in accordance with an embodiment.

FIG. 4 shows an illustrative example of a process 400 for generating optimized executable code, in accordance with an embodiment. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, software, or combinations thereof In an embodiment, the code is stored on a computer-readable storage medium in the form of a computer program comprising a plurality of instructions executable by one or more processors. In an embodiment, the computer-readable storage medium is a non-transitory computer-readable medium. In an embodiment, at least some of the instructions usable to perform the process 400 are not stored solely using transitory signals (e.g., a propagating transient electric or electromagnetic transmission). A non-transitory computer-readable medium, in an embodiment, includes non-transitory data storage circuitry (e.g., buffers, caches, and queues) within transceivers of transitory signals. In an embodiment, the process 400 is performed by any suitable system, such as a compute resource in accordance with those described in connection with FIG. 1.

A computer system, in an embodiment, performs at least a portion of a process for generating executable code from an input expression by executing computer instructions for obtaining 402 a set of instructions for executing a computer program. In an embodiment, a computer program refers to a set of instructions encoded in a domain-specific language. In an embodiment, the computer program is encoded as a user-generated input program file. The system, in an embodiment, parses an input file provided by a user and builds an expression. In an embodiment, the system includes code for composing 404 a DAG from the computer system instructions where the nodes of the DAG represent matrix objects, denoting user specified input/output matrices, or intermediate matrices of various operations. In an embodiment, each node has an associated type which may be one of the following: an arithmetic operation; an assignment operation; a transposition operation; and input and output matrix. In an embodiment, each node of the DAG encodes metadata corresponding to the input such as its data size. In an embodiment, the size of a matrix object is encoded as the size of the data object along each dimension (e.g., for a two-dimensional matrix, the row and column sizes are stored as the data size vector). In an embodiment, the size of input matrices are specified by the user, and the size of intermediate and output matrices are calculated. The data sizes of other DAG types may be derived by using applicable mathematical rules, such as in the following manner:

$$[\langle e_1 \rangle]_{m,n} + [\langle e_2 \rangle]_{m,n} \rightarrow [\langle e_1 \rangle + \langle e_2 \rangle]_{m,n}$$

$$[\langle e_1 \rangle]_{m,n} - [\langle e_2 \rangle]_{m,n} \rightarrow [\langle e_1 \rangle - \langle e_2 \rangle]_{m,n}$$

$$[\langle e_1 \rangle]_{m,p} * [\langle e_2 \rangle]_{p,n} \rightarrow [\langle e_1 \rangle * \langle e_2 \rangle]_{m,n}$$

$$[\langle e_1 \rangle]^T_{m,n} \rightarrow [\langle e_1 \rangle^T]_{m,n}$$

$$[\langle M \rangle]^T_{m,n} = [\langle e_8 \rangle]_{m,n} \rightarrow [\langle M \rangle]_{m,n}$$

In an embodiment, the DAG is built from an input program and any common expressions are eliminated. in an embodiment, the expression DAG is built to propagate information between the nodes to extract polyhedral representation of the computation to be performed and, to assist in the process, some or all node N are associated with an integer set, called dataset (S(N)), and an affine map, called datamap (M(N)), as part of constructing the DAG. In an embodiment, a dataset is a convex polyhedral representation of data elements of a node. In an embodiment, a datamap is an affine relation that captures data-layout information of a dataset. In an embodiment, a matrix A has a dataset {A[i,j]:<=i,j<10} and a matrix C has dataset {C[i,j]:0<=i,j<10} and the expression C=A semantically indicates that matrix C is an alias to A and, hence, both matrices A and C can share the same memory space (e.g., same physical memory address space). This information is captured using the datamap {C[i,j]->A[i,j]:}, in an embodiment, which indicates that dataset of C is an identity map to dataset of A.

The system, in an embodiment, performs steps for determining 406 a polyhedral model of the DAG by extracts the polyhedral model for the input program by building iteration domains, access functions, and data dependence relations corresponding to the expressions, in accordance with one embodiment. In an embodiment, the iteration domain and data dependence information are utilized to determine a valid schedule for the computation, whereas access functions are utilized for code generation. In an embodiment, iteration domains—which mathematically capture the operation of instances of expressions—are constructed using domain specific knowledge such as a set of domain specific rules. In an embodiment, iteration domains of different nodes live in different set spaces and are identified by their space names.

Access maps relate points in iteration domain to data sets and, in an embodiment, each operation is associated with two access maps—a read access map and a write access map. In an embodiment, read maps capture read information of an operation by relating its iteration domain points to datasets of its operands, whereas write maps capture write information by relating iteration domain points to its own data set. In an embodiment, aliases between data sets for the operands are resolved based on the datamaps.

In an embodiment and as part of building read-after-write data dependencies, intra-domain data dependencies are directly constructed based on domain specific knowledge; the intra-domain data dependencies are obtained by constructing live-maps that capture last-writer information. In an embodiment, the iteration domain for the expression A*B discussed in connection with FIG. 1 is given by $\{D_{1[i,j,k]}: 0 \leq i<1024 ^ 0 \leq j<1024 ^ 0 \leq k<1024\}$, and its write access map is $\{D_{1[i,j,k]} \rightarrow M\_1[i,j]:\}$. In an embodiment, domain specific knowledge f matrix-matrix multiplication is used to determine the last writers of D_1 to M1 are {D 1[i,j,k]:0<=i<1024

$0<=j<1024^\wedge k=1023\}$ and that the live-map for A*B is given by $\{D\ 1[i,j,k]->M\ 1[i,j]:0<=i<1024^\wedge 0<=j<1024^\wedge k=1023\}$.

Read-after-read dependencies indicate data reuse between points in an iteration domain, in an embodiment, and this information is taken into account while computing schedules to improve data locality. In an embodiment, given a union of read access relations (R) of all the operations, RAR dependencies ($R_R$) can be computed as follows: $R_R := R^{-1} \circ R$.

The system, in an embodiment, is further configured with instructions for using 408 the polyhedral model to determine an optimized or optimal schedule. In an embodiment, the system determines an improved schedule that reduces the runtime but is not necessarily optimal (e.g., a sub-optimal schedule improvement). In an embodiment, once the iteration domains and data dependencies are collected, an initial affine schedule is computed. In an embodiment, the initial affine schedule maximizes data reuse. In an embodiment, the DSL utilizes a scheduling algorithm (such as PLuTo's scheduling algorithm described in "A Practical Automatic Polyhedral Program Optimization System" by Bondhugula, et al.) to determine the optimal schedule. In an embodiment, PLuTo's cost function is used to maximize data reuse by generating a schedule that includes loop fusion transformations, is amenable to tiling, and other features which may be supported according to a configuration file. In an embodiment, loop fusion refers to a routine for replacing code for multiple loops with a single loop.

In an embodiment, to generate a SPMD code for GPUs, at least one outermost loop of the computed schedule is parallel. PLuTo, in an embodiment, generates a schedule that is outer-parallel/inner-sequential by default, and for each individual operation that is supported by the DSL, there exists at least one affine schedule with parallel outer loops. In an embodiment, maximally fusing the loops (e.g., as part of improving data locality) does not necessarily lead to an optimal scheduling as it may result in a schedule with no outer parallel loops—accordingly, the system may allow for application of fusion when it is detected that the fused schedule is not fully sequential to provide an initial schedule with a sequence of loop nests, each with at least one outer parallel loop. Consider the initial schedule computed for the expression E=(A+B)*(C+D) in an embodiment and a sequence including two loop nests, where the first loop nest computes the expression C+D, while the remaining addition and multiplication operations are fused into a single loop nest.

Once an initial affine schedule is determined, in an embodiment, a sequence of transformations and/or optimizations are applied, each of which adds further improvements to the schedule. In an embodiment, the transformations and optimizations to apply are specifiable in a configuration file. In an embodiment, the transformations are applied at a polyhedral level. In an embodiment, the transformations are directly handled during code generation. In an embodiment, one or more of the following transformations/operations are supported: tiling; insertion of data copy-in/copy-out statements; block-cyclic distribution of loops; double buffering; array transposition during copy; array padding; strip-mining; swizzling; loop unrolling; and any suitable combination thereof.

In an embodiment, tiling is utilized as an optimization to improve data locality and/or expose parallelism to workload distributions. In an embodiment, the schedule for the matrix-matrix multiplication C=A*B is used to generate a transformed schedule in the following manner:

Initial Schedule
for (i=0; i<1024; i++)
 for (j=0; j<1024; j++)
  for (k=0; k<1024; k++)
   C[i][j]+=A[i][k]*B[k][j];
Transformed Schedule After Single Level Of Tiling With Tilesize <16, 16, 16>
for (i=0; i<64; i++)
 for (j=0; j<64; j++)
  for (k=0; k<64; k++)
   for (ii=0; ii<16; ii++)
    for (jj=0; jj<16; jj++)
     for (kk=0; kk<16; kk++)
      C[16* i+ii][16* j+jj]+=A[16*i+ii][16*k+kk]
      *B[16*k+kk][16*j+jj];

As described above, the outer two parallel inter-tile loops are suitable for distribution among different threadblocks in a process such as a GPU, in an embodiment. Corresponding kernel functions obtained after distributing inter-tile iterations among threadblocks and inter-tile iterations among threads are, in an embodiment, described in the following manner:
 int bid_y=blockIdx.y;
 int bid_x=blockIdx.x;
 int tid_y=threadIdx.y;
 int tid_x=threadIdx.x;
 for (k=0; k<64; k++)
 for (kk=0; kk<16; kk++)
  C[16*bid_y+tid_y][16*bid_x+tid_x]+=
   A[16*bid_y+tid_y][16*k+kk]*
   B[16*k+kk][16*bid_x+tid_x];

Furthermore, the code has data reuse along multiple dimensions such that data shared between different inter-tile iterations can be reused through shared memory, in accordance with one embodiment.

In an embodiment, up to three levels of tiling are applied—block level, warp level, and thread level. In an embodiment, block level tiling allows distributions of iterations among threadblocks and reuse of data through shared memory. In an embodiment, warp level tiling is performed to aid application of warp level optimizations, as described in greater detail below. In an embodiment, thread level tiling distributes iterations among threads within a block, and also allows data reuse through registers.

Data reuse within a kernel occurs, in an embodiment, based on either RAR dependencies (e.g., same data is read multiple times within a kernel) or RAW dependencies (e.g., data is both computed and read within the same kernel). In an embodiment, since input expressions are enforced to be in single-assignment form, WAR/WAW dependencies are within a single statement and are implicitly covered by RAW dependencies. In an embodiment, input data access multiple times within a kernel are copied into shared memory prior to the actual computation and read from shared memory. In an embodiment, a temporary space in the shared memory is utilized to reuse data that is both written and read within the same kernel. In an embodiment and at the end of the computation, newly computed live-out data is copied out from shared memory to global memory. In an embodiment, the process involves the following steps: identifying reused accesses; determining data-tile sizes for reused data-sets; inserting new iteration domain and schedule for copy-in/copy-out code into previously computed schedule; and updating access functions of the statements.

In an embodiment, identifying inter-thread data reuse, in an embodiment, schedule-to-access map M for statements that are scheduled together within a device function are collected and, to compute inter-thread reuse, the innermost dimensions corresponding to schedules private to each thread are projected out from Domain(M). In an embodiment, the presence of inter-thread data reuse is checked by testing whether the resulting map R is mathematically injective. In an embodiment, inter-thread data reuse exists if and only if R is not injective based on principles of mathematical set theory. In an embodiment, data reused through registers is determined based on the techniques described above.

In an embodiment, tilesizes are determined once a union of reused data access maps, R, are collected in the following manner: the tile sizes of shared arrays are determined for each map m [e] R by checking if the range of m is a convex set and m is ignored if it is not convex. In an embodiment, outer)inter-tile dimensions corresponding to the threadblocks in the domain of m are parameterized. In an embodiment, this provides us with an access map for a single data-set accessed by any single parameterized threadblock. In an embodiment and for each dimension of the data-set, the system then checks whether a constant length for that dimension can be found from the constraints governing the Range(m) and if such a constant length cannot be found the data set is ignored, but if it is, offsets to the array accesses, in terms of the threadblock parameters, is extracted and stored for computing shared array to a global array access map. In an embodiment, if the thread access arrays in a strided pattern (e.g., with block-cyclic distribution) their stride lengths are extracted from the constraints.

For inserting copy-in/copy-out statement schedules and in an embodiment, for each data-set s for which a constant tilesize is found, a new iteration domain denoting the copy operation is constructed. In an embodiment, the constructed iteration domain is a basic convex integer set with sizes along each dimension equal to reused array sizes. In an embodiment, a schedule to copy the data is manually constructed such that global array accesses are coalesced. In an embodiment, array offset and stride information collected (e.g., previously) are utilized to build schedule-to-global array access maps.

To update access functions, the system, in an embodiment, extracts global-to-shared array maps once the copy-schedules and their access maps are built. In an embodiment, this information is utilized in connection with replacing global array access maps of various statements with shared array access maps.

In an embodiment, tiling, as described in greater detail below, block distributes loop iterations and results in a strided access pattern by threads. In an embodiment, with cyclic distribution, consecutive threads are configured to operate on consecutive data elements, thereby eliminating bank conflicts. In an embodiment, loads and stores are vectorized through block-cyclic distribution by distributing loop iterations among T threads (along each direction) with blocksize B, tiling loops to be distributed with tilesize T×B, and tiling the resulting intra-tile loop again with tilesize B, and then permutating the first level inter- and intra-tile loops. In an embodiment, each iteration of the outermost band of the resulting loop nest is assigned to be executed by a single thread. In an embodiment, a block-cyclically distributed version of single-precision general matrix multiply (SGEMM) code with blocksize of 4, allowing conflict free 128-bit vector loads of elements from shared arrays Bs to registers is implemented in the following manner:

```
for (int i=0; i<=1; i+=1)
  for (int j=0; j<=3; j+=1)
    Ap[4*i+j][0]=As[32*wid_y+4*lid_y+16*i+j][kk];
for (int i=0; i<=1; i+=1)
  for (int j=0; j<=3; j+=1)
    Bp[0][4*i+j]=Bs[kk][64*wid_x+4*lid_x+32*i+j];
for (int i=0; i<=1; i+=1)
  for (int j=0; j<=1; j+=1)
    for (int ii=0; ii<=3; ii+=1)
      for (int jj=0; jj<=3; jj+=1)
        Cp[4*i+ii][4*j+jj]+=Ap[4*i+ii][0]*Bp[0][4*j+jj];
```

In an embodiment, the following SGEMM kernel code implements three levels of tiling and utilizes shared memory and registers for data reuse:

```
int bid_y = blockIdx.y, bid_x = blockIdx.x;
int tid_y = threadIdx.y, tid_x = threadIdx.x;
int linearId = tid_y *16+ tid_x ;
int warpId = linearId /32;
int laneId = linearId %32;
int wid_y = warpId /2, wid_x = warpId %2;
int lid_y = laneId /8, lid_x = laneId %8;
_shared_float As[128][8], Bs[8][128];
float Ap[8][1] , Bp[1][8] , Cp[8][8] = {0};
for (int k=0; k <=127; k +=1) {
// Global -> Shared copy
  for (int i=0; i <=3; i +=1) {
    As[32* wid_y + 16* wid_x + lid_y +4* i][ lid_x ] = A[...];
    Bs[2* wid_y + wid_x ][8* lid_y + lid_x +32* i] = B[...];
  }
  _syncthreads ( );
  for (int kk = 0; kk <= 7; kk += 1) {
    // Shared -> Reg copy
    for (int i=0; i <=7; i +=1)
      Ap[i][0] = As[32* wid_y +8* lid_y +i][ kk ];
    for (int i=0; i <=7; i +=1)
      Bp[0][i] = Bs[kk ][64* wid_x +8* lid_x +i];
    // Compute
    for (int i=0; i <=7; i +=1)
      for (int j=0; j <=7; j +=1)
        Cp[i][j] += Ap[i][0] * Bp[0][j];
  }
  _syncthreads ( );
}
// Reg -> Global copy
for (int i=0; i <=7; i +=1) {
  for (int j=0; j <=7; j +=1) {
    C[...] = CP[i][j];
  }
}
```

In an embodiment, double buffering techniques for improving overlap between computations and data-movement at the cost of using addition shared memory is implemented wherein each threadblock loads a tile of data of the input array from global to shared memory and performs computations by reading data from shared memory. In an embodiment, all data required by a threadblock is loaded before starting the computation by making a _syncthreads( ) call between the data transfer and the computation loop. In an embodiment, the computation a _syncthreads( )function call is inserted after the computation loop and before new data is overwritten to the shared memory arrays. In an embodiment, a double-buffering implementation requires additional shared memory to be allocated and new data needed by the next iteration is loaded into this buffering space so that while some warps are still performing computational work, the remaining warps can safely load the data to the buffer space, thereby reducing or eliminating the need for synchronization at the end of the computation loop.

The DSL determines, in an embodiment, a set of loops and arrays that are appropriate for double buffering such that for a given loop l, all of the arrays that are copied in from global to shared memory in l are marked as double-buffered so that once a set of double-buffered arrays are collected, sizes of arrays marked as double-buffers are doubled and their corresponding _syncthreads( )calls are replaced with code to update the pointer to the right position in the buffer. In an embodiment, double-buffered version of SGEMM code is based on or implemented in the following manner:

```
_shared_ float As[2][128][8], Bs[2][8][128];
for (int k=0; k <=127; k +=1) {
  // Global -> Shared copy
  for (int i=0; i <=3; i +=1) {
    As[buf][32* wid_y +16* wid_x + lid_y +4* i][lid_x] = A[...];
    Bs[buf][2* wid_y + wid_x ][8* lid_y + lid_x +32* i] = B[...];
  }
  _syncthreads ( );
  for (int kk = 0; kk <= 7; kk += 1) {
    // Shared -> Reg copy
    for (int i=0; i <=1; i +=1)
      for (int j=0; j <=3; j +=1)
        Ap[4* i+j ][0] = As[buf][32* wid_y +4* lid_y +16* i+j][kk];
    for (int i = 0; i <= 1; i += 1)
      for (int j = 0; j <= 3; j += 1)
        Bp[0][4* i+j] = Bs[buf][kk][64* wid_x +4* lid_x +32* i+j];
    // Compute
    for (int i=0; i <=1; i +=1)
      for (int j=0; j <=1; j +=1)
        for (int ii =0; ii <=3; ii +=1)
          for (int jj =0; jj <=3; jj +=1)
            Cp[4* i+ii ][4* j+jj] += Ap[4* i+ii ][0] * Bp[0][4* j+jj ];
  }
  buf = (buf ? 0 : 1);
}
```

In an embodiment, an optimization based on array transposition during copying is implemented. In an embodiment, a shared memory array is accessed with a stride by different threads in a warp which leads to the possibility of shared memory bank conflicts. In order to minimize or reduce such conflicts, the DSL performs, in an embodiment, a check to determine if is beneficial to transpose an array as it is copied from global to shared memory. In an embodiment, the check comprises checking the access function of fastest varying dimension of to see if it is a function of thread indices and, if so, no changes are made, otherwise access function of the inner dimension depends on thread index, then the array is marked to be transposed while it is being copied from global memory. In an embodiment, sample code below illustrates generated code where the array A is transposed as it is being copied to shared array As, so that any later uses of A are free of shared bank conflicts.

In an embodiment, array padding involves an array that is transposed while it is stored, which introduces shared memory bank conflicts during store operation since the access function of inner dimension as it is being stored is a function of thread index. In an embodiment, such conflicts are prevented by padding arrays with potential conflicts with additional elements. In an embodiment, padding sizes are calculated as follows: first checking if the array access stride is a multiple of shared memory bank size and, if so, determining the number of consecutive banks n that are accessed by threads from a single warp, and padding the leading dimension of the array with n words.

In an embodiment, loops that copy in/out data from global to shared memory are strip-mined so that the copy operation is translated to vector loads/stores in the final executable. In an embodiment, strip mining is possible when both load and store addresses of consecutive iterations of a copy statement are to consecutive memory locations. In an embodiment, any arrays that are transposed on-the-fly during copy are not copied as vector loads.

In an embodiment, the following code is utilized:

```
_shared_ float As[2][8][128], Bs[2][8][128];
for (int k=0; k <=127; k +=1) {
  // Global -> Shared copy
  for (int i=0; i <=3; i +=1) {
    As[buf ][lid_x ][32* wid_y +16* wid_x + lid_y +4* i]
      = A [...];
    Bs[ buf ][2* wid_y + wid_x ][8* lid_y + lid_x +32* i]
      = B[128* bid_x +2048* wid_y +1024* wid_x+8* lid_y +
      P11 lid_x +8192* k +32* i];
  }
  _syncthreads ( );
  for (int kk = 0; kk <= 7; kk += 1) {
    // Shared -> Reg copy
    for (int i=0; i <=1; i += 1)
      for (int j=0; j <=3; j += 1)
        Ap[4* i+j ][0] = As[buf][kk][32* wid_y +4* lid_y +16* i+j];
    for (int i = 0; i <= 1; i += 1)
      for (int j = 0; j <= 3; j += 1)
        Bp[0][4* i+j] = Bs[buf][ kk ][64* wid_x +4* lid_x +32* i+j];
    // Compute
    for (int i = 0; i <=1; i +=1)
      for (int j = 0; j <=1; j +=1)
        for (int ii = 0; ii <=3; ii +=1)
          for (int jj = 0; jj <=3; jj +=1)
            Cp[4* i+ii ][4* j+jj] += Ap[4* i+ii ][0] * Bp[0][4* j+jj ];
  }
  buf = (buf ? 0 : 1);
}
```

In an embodiment, the code above shows the generated code where the array A is transposed as it is copied to shared array As, so that any later uses of A are free of shared bank conflicts. In an embodiment, the access As[buf][lid x][32*wid y+16*wid x+lid y+4*i] shown above in which consecutive threads access elements at a stride of 128, each warp copies four columns of data from global to shared memory, making each warp access data from four consecutive bank, and the array As is padded with 4 words to prevent conflicts and the padded array As is declared as shared float As[2][8][128+4]. In the copy operation Bs[buf][2*wid y+wid x][8*lid y+lid x+32*i]=B[128*bid x+2048*wid y+1024*wid x +8*lid y+lid x+8192*k+32*i];, consecutive threads load consecutive words from global memory and store to consecutive locations in shared memory.

In an embodiment, access pattern to input arrays of linear algebra computations are regular and multiple threads require same data, such as in case of matrix-matrix multiplication, different threads that compute different columns of a single row need to read same element of array A, and different threads that compute different rows of a single column read same element of array B. In an embodiment, different GPU architectures have support for local broadcast of data between threads accessing same elements from shared memory, if their thread ids match certain bit pattern, thus improving shared memory load bandwidth. In an embodiment, this bit pattern, referred to as a swizzling pattern, is hardware dependent. In an embodiment, instead of consecutive lanes in a warp computing consecutive iterations of computation, the lanes are permuted/swizzled such that their read accesses match the swizzling pattern of the architecture. In an embodiment, these patterns are represented as affine functions and once an affine representation of the swizzling pattern is constructed from hardware specific information, the permutation affine map is applied to the already computed schedule to obtain a schedule optimized with swizzling.

In an embodiment, the system performs steps for generating 410 executable code from the schedule. In an embodiment, once optimal schedules for computation statements, and various copy statements have been found, CUDA code corresponding to the schedule is generated and ISL provides a sequence of loop nests corresponding to the schedule. In an embodiment, outermost parallel band of the generated code is distributed among threadblocks, and the next two levels of parallel bands—corresponding to warps and lanes—are distributed among threads.

In an embodiment, the optimized executable code corresponding to the matrix-matrix multiplication expression C=A*B; (without loop unrolling performed) is as follows:

```
_global_ void ladsl_kern0 ( const float * A,
const float * B, float * _restrict_ C)
{
  int bid_y = blockIdx .y, bid_x = blockIdx .x;
  int tid_y = threadIdx .y, tid_x = threadIdx .x;
  int linearId = tid_y *16+ tid_x ;
  int warpId = linearId /32;
  int laneId = linearId %32;
  int wid_y = warpId /2, wid_x = warpId %2;
  int lid_y = laneId /8, lid_x = laneId %8;
  _shared_ _align_ (8) float As [2][8][128+4];
  _shared_ _align_ (8) float Bs [2][8][128+0];
  float Ap [8][1] , Bp [1][8] , Cp [8][8] = {0};
  int buf = 0;
  for (int k =0; k<=127; k +=1) {
    // Global -> Shared copy
    for (int i =0; i <=3; i +=1)
      As[buf ][ lid_x ][32* wid_y +16* wid_x + lid_y +4* i]
        = A [131072* bid_y +32768* wid_y +16384* wid_x
        +1024* lid_y + lid_x +8*k +4096* i];
    for (int i =0; i <=1; i +=1)
      for (int j =0; j <=1; j +=1)
        Bs[ buf ][2* wid_y + wid_x ][16* lid_y +2* lid_x +64* i+j]
          = B [128* bid_x +2048* wid_y +1024* wid_x
          +16* lid_y +2* lid_x +8192* k +64* i+j];
    _syncthreads ( );
    for (int kk = 0; kk <= 7; kk += 1) {
      // Shared -> Reg copy
      for (int i =0; i <=1; i +=1)
        for (int j =0; j <=3; j +=1)
          Ap [4*i+j ][0] = As[buf ][ kk ][4*( lid_x %2)+32* wid_y
            +16* i+j +8*((8* lid_y + lid_x )/16)];
      for (int i = 0; i <= 1; i+= 1)
        for (int j = 0; j <= 3; j += 1)
          Bp [0][4* i+j] = Bs[buf ][ kk ][2*((8* lid_y + lid_x )%16)
            −2*( lid_x %2)+64* wid_x +32* i+j];
      // Compute
      for (int i =0; i <=1; i +=1)
        for (int j =0; j <=1; j +=1)
          for (int ii =0; ii <=3; ii +=1)
            for (int jj =0; jj <=3; jj +=1)
              Cp [4*i+ii ][4* j+jj] +=
                Ap [4*i+ii ][0] * Bp [0][4* j+jj ];
    }
    buf = ( buf ? 0 : 1);
  }
  // Registers -> Global copy
  for (int i = 0; i <= 1; i += 1)
    for (int j  = 0; j <= 1; j += 1)
      for (int ii = 0; ii <= 3; ii += 1)
        for (int jj = 0; jj <= 3; jj += 1)
          C [4094*( lid_x %2) −510*((8* lid_y + lid_x )%16)
            +131072* bid_y + 128* bid_x +32768* wid_y
            +64* wid_x+4096* lid_y +512* lid_x
            +16384* i +32* j +1024* ii+jj]
              = Cp [4* i+ii ][4* j+jj ];
}
```

Figure 5:
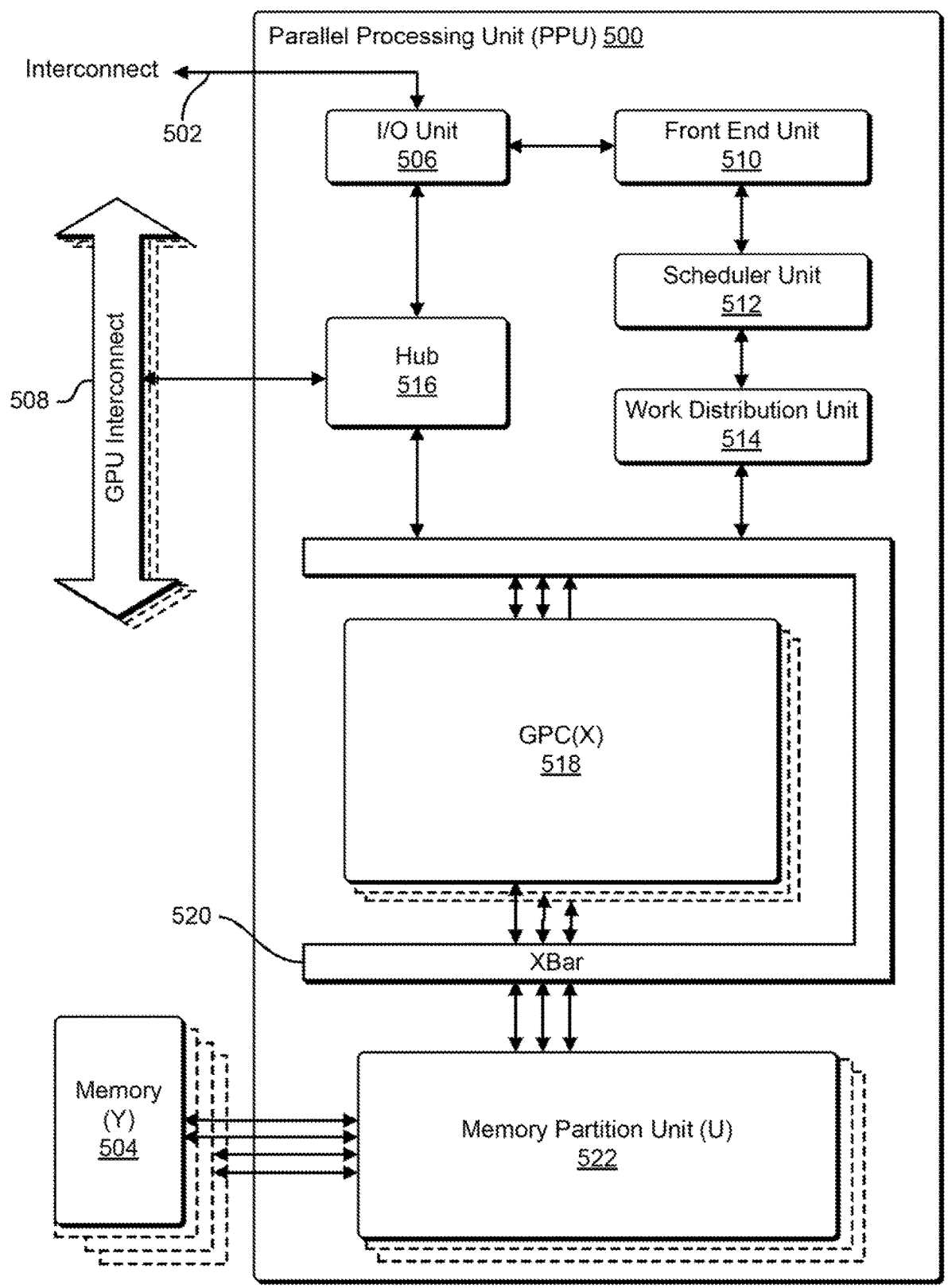
FIG. 5 illustrates a parallel processing unit (PPU), in accordance with one embodiment.

FIG. 5 illustrates a parallel processing unit ("PPU") 500, in accordance with one embodiment. In an embodiment, the PPU 500 is configured with machine-readable code that, if executed by the PPU, causes the PPU to perform some or all of processes and techniques described throughout this disclosure. In an embodiment, the PPU 500 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 500. In an embodiment, the PPU 500 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 500 is utilized for perform computations such as linear algebra operations and machine-learning operations. FIG. 5 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 500 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 500 includes an Input/Output ("I/O") unit 505, a front-end unit 510, a scheduler unit 512, a work distribution unit 514, a hub 516, a crossbar ("Xbar") 520, one or more general processing clusters ("GPCs") 518, and one or more partition units 522. In an embodiment, the PPU 500 is connected to a host processor or other PPUs 500 via one or more high-speed GPU interconnects 58. In an embodiment, the PPU 500 is connected to a host processor or other peripheral devices via an interconnect 502. In an embodiment, the PPU 500 is connected to a local memory comprising one or more memory devices 504. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 58 may refer to a wire-based multi-lane communications link that is used by systems to scale and include one or more PPUs 500 combined with one or more CPUs, supports cache coherence between the PPUs 500 and CPUs, and CPU mastering. In an embodiment, data and/or commands are transmitted by the high-speed GPU interconnect 58 through the hub 516 to/from other units of the PPU 500 such as one or more copy engines, video encoders, video decoders, power management units, and other components which may not be explicitly illustrated in FIG. 5.

In an embodiment, the I/O unit 505 is configured to transmit and receive communications (e.g., commands, data) from a host processor (not illustrated in FIG. 5) over the system bus 502. In an embodiment, the I/O unit 505 communicates with the host processor directly via the system bus 502 or through one or more intermediate devices such as a memory bridge. In an embodiment, the I/O unit 505 may communicate with one or more other processors, such as one or more the PPUs 500 via the system bus 502. In an embodiment, the I/O unit 505 implements a Peripheral Component Interconnect Express ("PCIe") interface for communications over a PCIe bus. In an embodiment, the I/O unit 505 implements interfaces for communicating with external devices.

In an embodiment, the I/O unit 505 decodes packets received via the system bus 502. In an embodiment, at least some packets represent commands configured to cause the PPU 500 to perform various operations. In an embodiment, the I/O unit 505 transmits the decoded commands to various other units of the PPU 500 as specified by the commands. In an embodiment, commands are transmitted to the front-end unit 510 and/or transmitted to the hub 516 or other units of the PPU 500 such as one or more copy engines, a video encoder, a video decoder, a power management unit, etc. (not explicitly illustrated in FIG. 5). In an embodiment, the I/O unit 505 is configured to route communications between and among the various logical units of the PPU 500.

In an embodiment, a program executed by the host processor encodes a command stream in a buffer that provides workloads to the PPU 500 for processing. In an embodiment, a workload comprises instructions and data to be processed by those instructions. In an embodiment, the buffer is a region in a memory that is accessible (e.g., read/write) by both the host processor and the PPU 500—the host interface unit may be configured to access the buffer in a system memory connected to the system bus 502 via memory requests transmitted over the system bus 502 by the I/O unit 505. In an embodiment, the host processor writes the command stream to the buffer and then transmits a pointer to the start of the command stream to the PPU 500 such that the front-end unit 510 receives pointers to one or more command streams and manages the one or more streams, reading commands from the streams and forwarding commands to the various units of the PPU 500.

In an embodiment, the front-end unit 510 is coupled to a scheduler unit 512 that configures the various GPCs 518 to process tasks defined by the one or more streams. In an embodiment, the scheduler unit 512 is configured to track state information related to the various tasks managed by the scheduler unit 512 where the state information may indicate which GPC 518 a task is assigned to, whether the task is active or inactive, a priority level associated with the task, and so forth. In an embodiment, the scheduler unit 512 manages the execution of a plurality of tasks on the one or more GPCs 518.

In an embodiment, the scheduler unit 512 is coupled to a work distribution unit 514 that is configured to dispatch tasks for execution on the GPCs 518. In an embodiment, the work distribution unit 514 tracks a number of scheduled tasks received from the scheduler unit 512 and the work distribution unit 514 manages a pending task pool and an active task pool for each of the GPCs 518. In an embodiment, the pending task pool comprises a number of slots (e.g., 32 slots) that contain tasks assigned to be processed by a particular GPC 518; the active task pool may comprise a number of slots (e.g., 4 slots) for tasks that are actively being processed by the GPCs 518 such that as a GPC 518 completes the execution of a task, that task is evicted from the active task pool for the GPC 518 and one of the other tasks from the pending task pool is selected and scheduled for execution on the GPC 518. In an embodiment, if an active task is idle on the GPC 518, such as while waiting for a data dependency to be resolved, then the active task is evicted from the GPC 518 and returned to the pending task pool while another task in the pending task pool is selected and scheduled for execution on the GPC 518.

In an embodiment, the work distribution unit 514 communicates with the one or more GPCs 518 via XBar 520. In an embodiment, the XBar 520 is an interconnect network that couples many of the units of the PPU 500 to other units of the PPU 500 and can be configured to couple the work distribution unit 514 to a particular GPC 518. Although not shown explicitly, one or more other units of the PPU 500 may also be connected to the XBar 520 via the hub 516.

The tasks are managed by the scheduler unit 512 and dispatched to a GPC 518 by the work distribution unit 514. The GPC 518 is configured to process the task and generate results. The results may be consumed by other tasks within the GPC 518, routed to a different GPC 518 via the XBar 520, or stored in the memory 504. The results can be written to the memory 504 via the partition units 522, which implement a memory interface for reading and writing data to/from the memory 504. The results can be transmitted to another PPU 504 or CPU via the high-speed GPU interconnect 58. In an embodiment, the PPU 500 includes a number U of partition units 522 that is equal to the number of separate and distinct memory devices 504 coupled to the PPU 500. A partition unit 522 will be described in more detail below in conjunction with FIG. 7.

In an embodiment, a host processor executes a driver kernel that implements an application programming interface ("API") that enables one or more applications executing on the host processor to schedule operations for execution on the PPU 500. In an embodiment, multiple compute applications are simultaneously executed by the PPU 500 and the PPU 500 provides isolation, quality of service ("QoS"), and independent address spaces for the multiple compute applications. In an embodiment, an application generates instructions (e.g., in the form of API calls) that cause the driver kernel to generate one or more tasks for execution by the PPU 500 and the driver kernel outputs tasks to one or more streams being processed by the PPU 500. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 7A.

Figure 6:
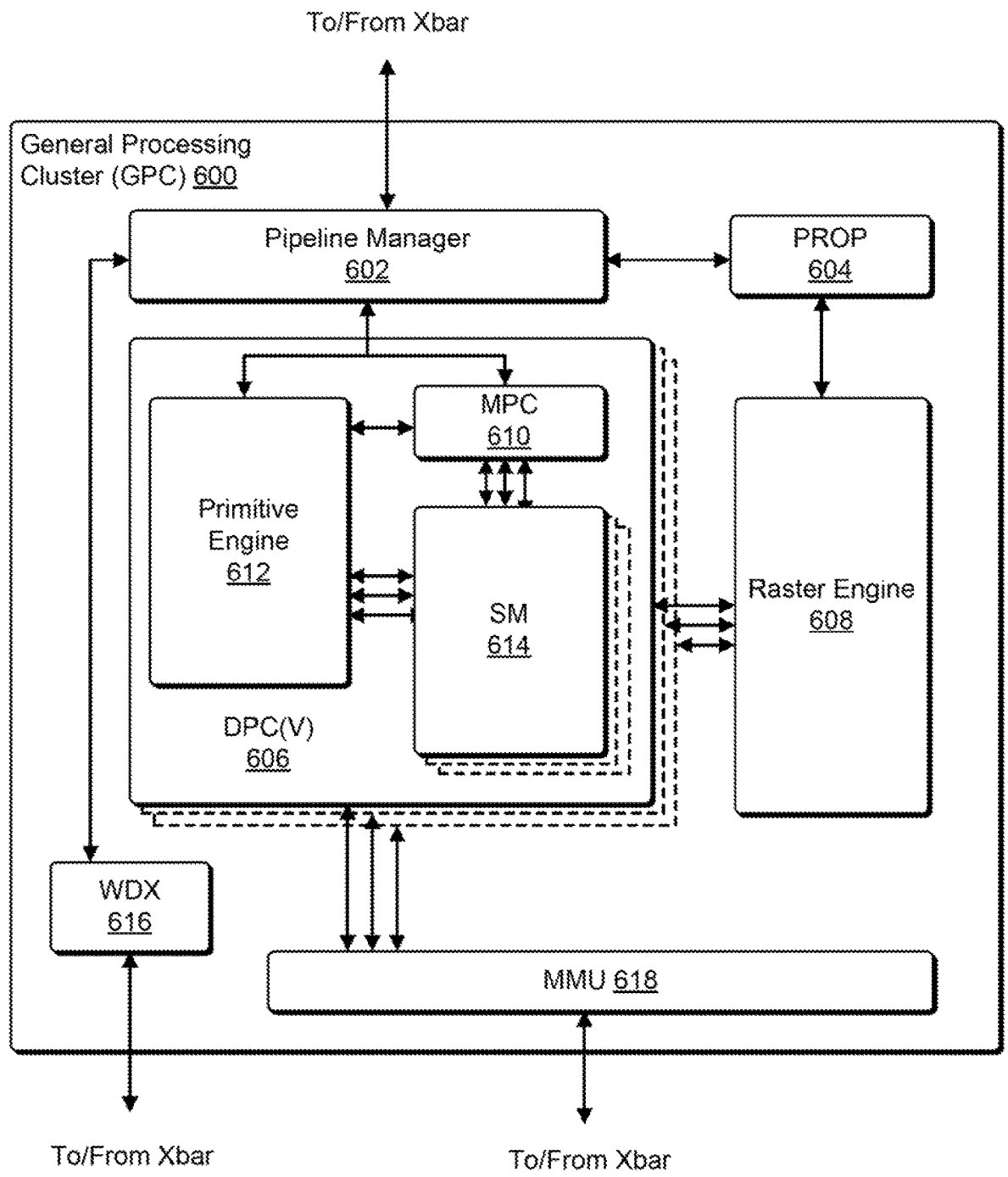
FIG. 6 illustrates a general processing cluster (GPC), in accordance with one embodiment.

FIG. 6 illustrates a GPC 600 such as the GPC illustrated of the PPU 500 of FIG. 5, in accordance with one embodiment. In an embodiment, each GPC 600 includes a number of hardware units for processing tasks and each GPC 600 includes a pipeline manager 602, a pre-raster operations unit ("PROP") 604, a raster engine 608, a work distribution crossbar ("WDX") 616, a memory management unit ("MMU") 618, one or more Data Processing Clusters ("DPCs") 606, and any suitable combination of parts. It will be appreciated that the GPC 600 of FIG. 6 may include other hardware units in lieu of or in addition to the units shown in FIG. 6.

In an embodiment, the operation of the GPC 600 is controlled by the pipeline manager 602. The pipeline manager 602 manages the configuration of the one or more DPCs 606 for processing tasks allocated to the GPC 600. In an embodiment, the pipeline manager 602 configures at least one of the one or more DPCs 606 to implement at least a portion of a graphics rendering pipeline. In an embodiment, a DPC 606 is configured to execute a vertex shader program on the programmable streaming multiprocessor ("SM") 614. The pipeline manager 602 is configured to route packets received from a work distribution to the appropriate logical units within the GPC 600, in an embodiment, and some packets may be routed to fixed function hardware units in the PROP 604 and/or raster engine 608 while other packets may be routed to the DPCs 606 for processing by the primitive engine 612 or the SM 614. In an embodiment, the pipeline manager 602 configures at least one of the one or more DPCs 606 to implement a neural network model and/or a computing pipeline.

The PROP unit 604 is configured, in an embodiment, to route data generated by the raster engine 608 and the DPCs 606 to a Raster Operations ("ROP") unit in the memory partition unit, described in more detail above. In an embodiment, the PROP unit 604 is configured to perform optimizations for color blending, organize pixel data, perform address translations, and more. The raster engine 608 includes a number of fixed function hardware units configured to perform various raster operations, in an embodiment, and the raster engine 608 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 608 comprises fragments to be processed by any suitable entity such as by a fragment shader implemented within a DPC 606.

In an embodiment, each DPC 606 included in the GPC 600 comprises an M-Pipe Controller ("MPC") 610; a primitive engine 612; one or more SMs 614; and any suitable combination thereof. In an embodiment, the MPC 610 controls the operation of the DPC 606, routing packets received from the pipeline manager 602 to the appropriate units in the DPC 606. In an embodiment, packets associated with a vertex are routed to the primitive engine 612, which is configured to fetch vertex attributes associated with the vertex from memory; in contrast, packets associated with a shader program may be transmitted to the SM 614.

In an embodiment, the SM 614 comprises a programmable streaming processor that is configured to process tasks represented by a number of threads. In an embodiment, the SM 614 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 614 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 614 is described in more detail below.

In an embodiment, the MMU 618 provides an interface between the GPC 600 and the memory partition unit and the MMU 618 provides translation of virtual addresses into physical addresses, memory protection, and arbitration of memory requests. In an embodiment, the MMU 618 provides one or more translation lookaside buffers ("TLBs") for performing translation of virtual addresses into physical addresses in memory.

Figure 7:
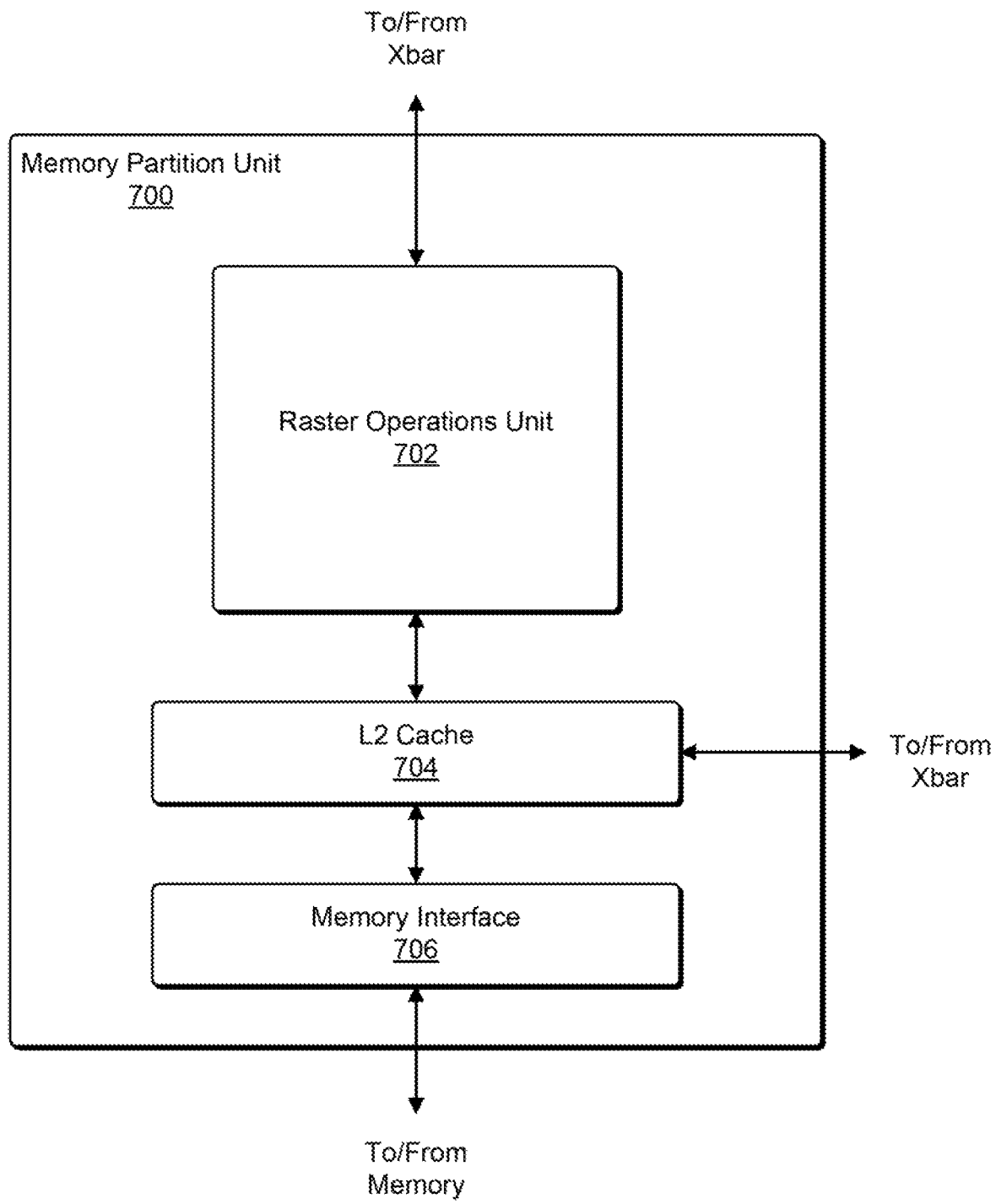
FIG. 7 illustrates a memory partition unit, in accordance with one embodiment.

FIG. 7 illustrates a memory partition unit of a PPU, in accordance with one embodiment. In an embodiment, the memory partition unit 700 includes a Raster Operations ("ROP") unit 702; a level two ("L2") cache 704; a memory interface 706; and any suitable combination thereof. The memory interface 706 is coupled to the memory. Memory interface 706 may implement 32, 64, 128, 1024-bit data buses, or the like, for high-speed data transfer. In an embodiment, the PPU incorporates U memory interfaces 706, one memory interface 706 per pair of partition units 700, where each pair of partition units 700 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 706 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 700 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 58 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 700 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 5 or other system memory is fetched by the memory partition unit 700 and stored in the L2 cache 704, which is located on-chip and is shared between the various GPCs, in accordance with one embodiment. Each memory partition unit 700, in an embodiment, includes at least a portion of the L2 cache 660 associated with a corresponding memory device. In an embodiment, lower level caches are implemented in various units within the GPCs. In an embodiment, each of the SMs 740 may implement a level one ("L1") cache wherein the L1 cache is private memory that is dedicated to a particular SM 740 and data from the L2 cache 704 is fetched and stored in each of the L1 caches for processing in the functional units of the SMs 740. In an embodiment, the L2 cache 704 is coupled to the memory interface 706 and the XBar 520.

The ROP unit 702 performs graphics raster operations related to pixel color, such as color compression, pixel blending, and more, in an embodiment. The ROP unit $$50, in an embodiment, implements depth testing in conjunction with the raster engine 725, receiving a depth for a sample location associated with a pixel fragment from the culling engine of the raster engine 725. In an embodiment, the depth is tested against a corresponding depth in a depth buffer for a sample location associated with the fragment. In an embodiment, if the fragment passes the depth test for the sample location, then the ROP unit 702 updates the depth buffer and transmits a result of the depth test to the raster engine 725. It will be appreciated that the number of partition units 700 may be different than the number of GPCs and, therefore, each ROP unit 702 can, in an embodiment, be coupled to each of the GPCs. In an embodiment, the ROP unit 702 tracks packets received from the different GPCs and determines which that a result generated by the ROP unit 702 is routed to through the Xbar.

Figure 8:
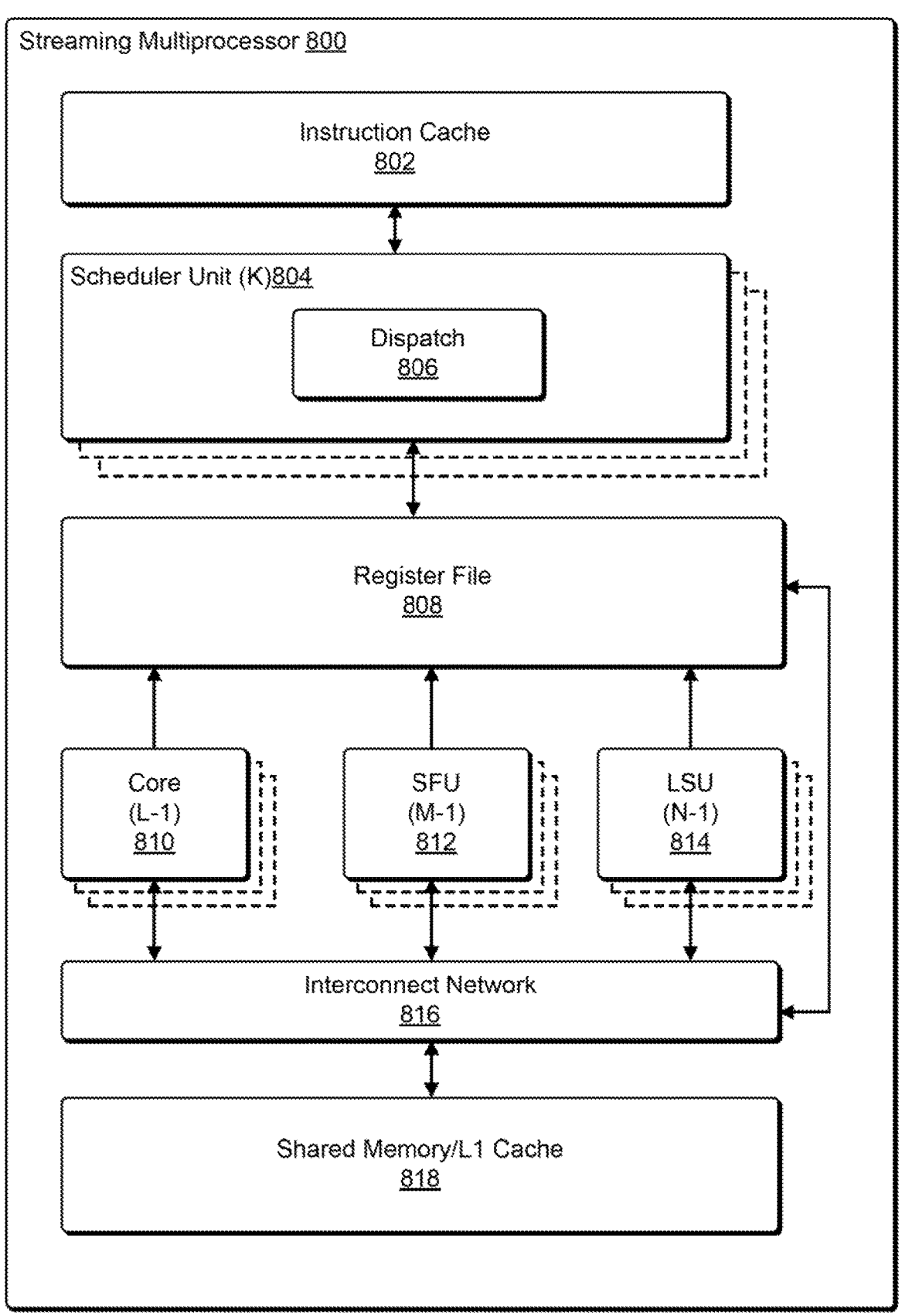
FIG. 8 illustrates a streaming multiprocessor, in accordance with one embodiment.

FIG. 8 illustrates a streaming multi-processor such as the streaming multi-processor of FIG. 6, in accordance with one embodiment. In an embodiment, the SM 800 includes: an instruction cache 802; one or more scheduler units 804; a register file 808; one or more processing cores 810; one or more special function units ("SFUs") 812; one or more load/store units ("LSUs") 814; an interconnect network 816; a shared memory/L1 cache 818; and any suitable combination thereof. In an embodiment, the work distribution unit dispatches tasks for execution on the GPCs of the PPU and the each task is allocated to a particular DPC within a GPC and, if the task is associated with a shader program, the task is allocated to an SM 800. In an embodiment, the scheduler unit 804 receives the tasks from the work distribution unit and manages instruction scheduling for one or more thread blocks assigned to the SM 800. In an embodiment, the scheduler unit 804 schedules thread blocks for execution as warps of parallel threads, wherein each thread block is allocated at least one warp. In an embodiment, each warp executes threads. In an embodiment, the scheduler unit 804 manages a plurality of different thread blocks, allocating the warps to the different thread blocks and then dispatching instructions from the plurality of different cooperative groups to the various functional units (e.g., cores 810, SFUs 812, and LSUs 814) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 806 is configured to transmit instructions to one or more of the functional units and the scheduler unit 804 includes two dispatch units 806 that enable two different instructions from the same warp to be dispatched during each clock cycle. In an embodiment, each scheduler unit 804 includes a single dispatch unit 806 or additional dispatch units 806.

Each SM 800, in an embodiment, includes a register file 808 that provides a set of registers for the functional units of the SM 800. In an embodiment, the register file 808 is divided between each of the functional units such that each functional unit is allocated a dedicated portion of the register file 808. In an embodiment, the register file 808 is divided between the different warps being executed by the SM 800 and the register file 808 provides temporary storage for operands connected to the data paths of the functional units. In an embodiment, each SM 800 comprises a plurality of L processing cores 810. In an embodiment, the SM 800 includes a large number (e.g., 128 or more) of distinct processing cores 810. Each core 810, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 810 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 810. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation $$D=A\times B+C,$$

where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 800 comprises M SFUs 812 that perform special functions (e.g., attribute evaluation, reciprocal square root, and the like). In an embodiment, the SFUs 812 include a tree traversal unit configured to traverse a hierarchical tree data structure. In an embodiment, the SFUs 812 include texture unit configured to perform texture map filtering operations. In an embodiment, the texture units are configured to load texture maps (e.g., a 2D array of texels) from the memory and sample the texture maps to produce sampled texture values for use in shader programs executed by the SM 800. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 800 includes two texture units.

Each SM 800 comprises N LSUs 754 that implement load and store operations between the shared memory/L1 cache 706 and the register file 808, in an embodiment. Each SM 800 includes an interconnect network 816 that connects each of the functional units to the register file 808 and the LSU 814 to the register file 808, shared memory/L1 cache 818 in an embodiment. In an embodiment, the interconnect network 816 is a crossbar that can be configured to connect any of the functional units to any of the registers in the register file 808 and connect the LSUs 814 to the register file and memory locations in shared memory/L1 cache 818.

The shared memory/L1 cache 818 is an array of on-chip memory that allows for data storage and communication between the SM 800 and the primitive engine and between threads in the SM 800 in an embodiment. In an embodiment, the shared memory/L1 cache 818 comprises 128 KB of storage capacity and is in the path from the SM 800 to the partition unit. The shared memory/L1 cache 818, in an embodiment, is used to cache reads and writes. One or more of the shared memory/L1 cache 818, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 818 enables the shared memory/L1 cache 818 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 800 to execute the program and perform calculations, shared memory/L1 cache 818 to communicate between threads, and the LSU 814 to read and write global memory through the shared memory/L1 cache 818 and the memory partition unit, in accordance with one embodiment. In an embodiment, when configured for general purpose parallel computation, the SM 800 writes commands that the scheduler unit that can be used to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 9:
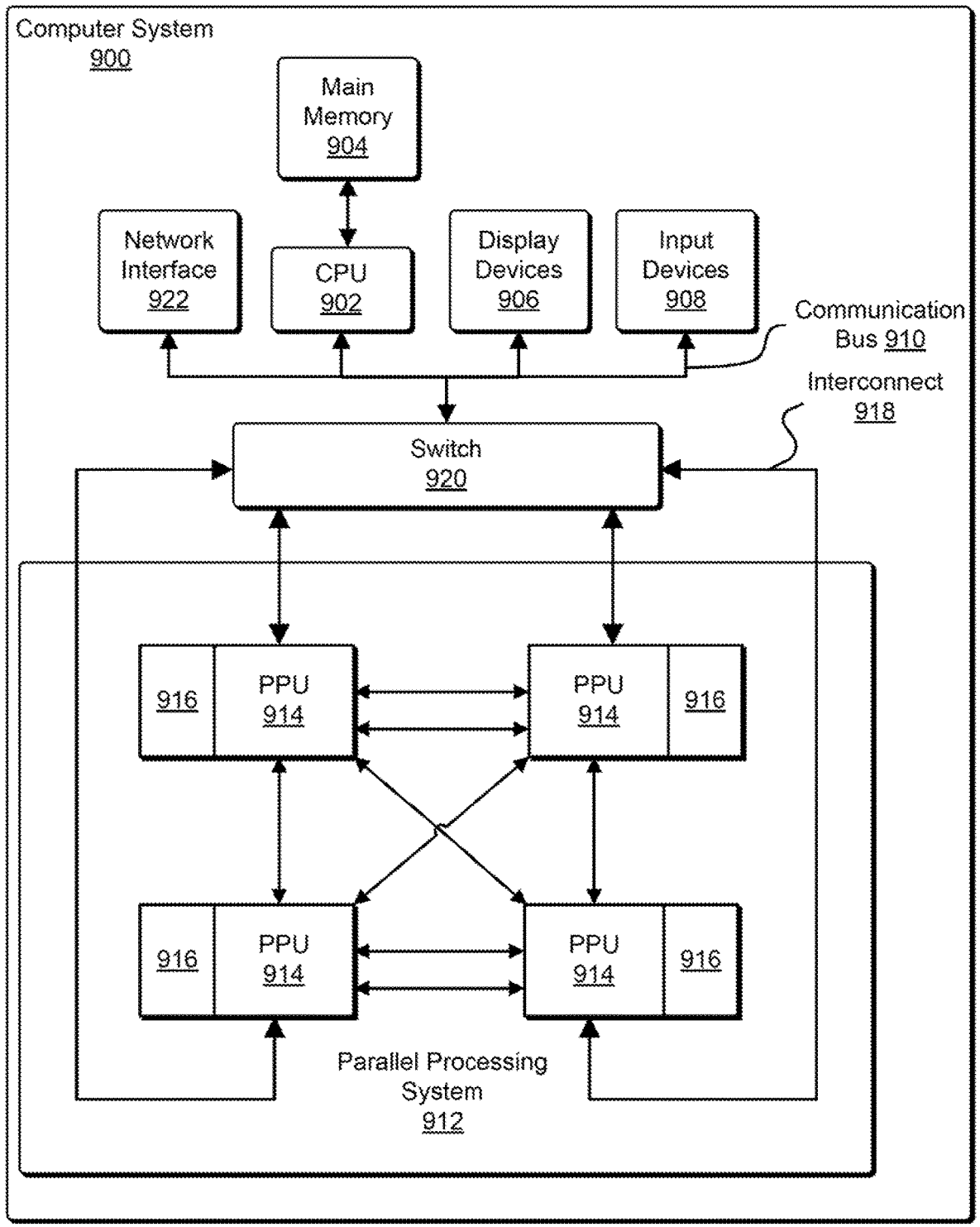
FIG. 9 illustrates a computer system that can be implemented in connection with a PPU, in accordance with one embodiment.

FIG. 9 illustrates a computer system 900 in which the various architecture and/or functionality can be implemented, in accordance with one embodiment. The computer system 900, in an embodiment, is configured to implement various processes and methods described throughout this disclosure.

In an embodiment, the computer system 900 comprises at least one central processing unit 902 that is connected to a communication bus 910 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 900 includes a main memory 904 and control logic (e.g., implemented as hardware, software, or a combination thereof) and data are stored in the main memory 904 which may take the form of random access memory ("RAM"). In an embodiment, a network interface subsystem 922 provides an interface to other computing devices and networks for receiving data from and transmitting data to other systems from the computer system 900.

The computer system 900, in an embodiment, includes input devices 908, the parallel processing system 912, and display devices 906 which can be implemented using a conventional CRT (cathode ray tube), LCD (liquid crystal display), LED (light emitting diode), plasma display, or other suitable display technologies. In an embodiment, user input is received from input devices 908 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 904 and/or secondary storage. Computer programs, if executed by one or more processors, enable the system 900 to perform various functions in accordance with one embodiment. The memory 904, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 902; parallel processing system 912; an integrated circuit capable of at least a portion of the capabilities of both the central processor 902 the parallel processing system 912; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 900 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 912 includes a plurality of PPUs 914 and associated memories 916. In an embodiment, the PPUs are connected to a host processor or other peripheral devices via an interconnect 918 and a switch 920 or multiplexer. In an embodiment, the parallel processing system 912 distributes computational tasks across the PPUs 914 which can be parallelizable—for example, as part of the distribution of computational tasks across multiple GPU thread blocks. In an embodiment, memory is shared and accessible (e.g., for read and/or write access) across some or all of the PPUs 914, although such shared memory may incur performance penalties relative to the use of local memory and registers resident to a PPU. In an embodiment, the operation of the PPUs 914 is synchronized through the use of a command such as—syncthreads( )which requires all threads in a block (e.g., executed across multiple PPUs 914) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
performing a compiler to:
determine a set of dependencies and iteration domains based, at least in part, on a directed acyclic graph of a computer program;
identify a number of software kernels to be performed based, at least in part, on an intermediate representation (IR) of the computer program to be performed by the number of software kernels;
compute, based, at least in part, on the set of dependencies and the iteration domains, a first affine schedule that includes at least one loop fusion transformation, wherein the first affine schedule is outer-parallel and inner-sequential;
determine a second affine schedule by applying one or more optimizations to the first affine schedule; and
generate executable code for the number of software kernels based, at least in part, on the second affine schedule.

2. The computer-implemented method of claim 1, wherein the software kernels are based, at least in part, on computer system instructions encoded in a domain-specific language.

3. The computer-implemented method of claim 1, further comprising:
receiving an input program file for the computer program and a configuration file encoding one or more parameters;
wherein the directed acyclic graph is composed from computer system instructions of the input program file; and
an optimization of the one or more optimization to apply is determined based, at least in part, on the one or more parameters encoded in the configuration file.

4. The computer-implemented method of claim 3, wherein the one or more parameters comprise at least one of:
swizzling;
unrolling; or
block-cyclic distribution.

5. The computer-implemented method of claim 1, further comprising generating one or more parallel outmost loops to enable the software kernels to be performed in parallel.

6. The computer-implemented method of claim 1, further comprising performing the compiler to generate the number of software kernels to be of sufficient size to perform the computer program.

7. A system, comprising memory to store instructions that, as a result of execution by one or more processors, cause the system to:
perform a compiler to:
determine a set of dependencies and iteration domains based, at least in part, on a directed acyclic graph of a computer program;
identify a number of software kernels to be performed based, at least in part, on an intermediate representation (IR) of the computer program to be performed by the number of software kernels;
compute, based, at least in part, on the set of dependencies and the iteration domains, a first affine schedule that includes at least one loop fusion transformation, wherein the first affine schedule is outer-parallel and inner-sequential;
determine a second affine schedule by applying one or more optimizations to the first affine schedule; and
generate executable code for the number of software kernels based, at least in part, on the second affine schedule.

8. The system of claim 7, wherein the instructions, as a result of execution by the one or more fust-processors, further cause the system to generate the directed acyclic graph from the computer program, the directed acyclic graph comprising a plurality of nodes, wherein one or more root nodes of the plurality of nodes are determined based, at least in part, on one or more input expressions of the computer program and one or more leaf nodes of the plurality of nodes are determined based, at least in part, on one or more output expressions of the computer program.

9. The system of claim 8, wherein:
a node of the plurality of nodes is associated with an affine set and an affine map; and
the first affine schedule is determined based, at least in part, on the affine set and the affine map.

10. The system of claim 7, wherein a software kernel of the software kernels is associated with a static control part (SCoP) of the computer program that includes one or more loops with constant strides and one or more conditional statements whose conditional expressions are affine functions.

11. The system of claim 7, wherein the instructions include instructions to generate the first affine schedule based on improving data reuse and the one or more optimizations including at least one of: tiling, block-cyclic distribution, double-buffering, array transposition during copy, array padding, strip-mining, swizzling, or loop unrolling.

12. The system of claim 11, wherein the instructions, as a result of execution by the one or more processors, further cause the system to determine whether to apply a particular optimization of the one or more optimizations based, at least in part, on one or more parameters configurable by a user via a configuration file.

13. The system of claim 7, wherein:
the number of software kernels is identified based, at least in part, on a first processor architecture; and
the instructions, as a result of execution by the one or more processors, further cause the system to generate different executable code based, at least in part, on scheduling operations and a second processor architecture, the second processor architecture being different from the first processor architecture.

14. The system of claim 7, wherein the software kernels are executable according to a graphics processing unit (GPU) microarchitecture.

15. A non-transitory computer-readable storage medium having stored thereon executable instructions that, as a result of being executed by one or more processors of a computer system, cause the computer system to at least:
perform a compiler to:
determine a set of dependencies and iteration domains based, at least in part, on a directed acyclic graph of a computer program;
identify a number of software kernels to be performed based, at least in part, on an intermediate representation (IR) of the computer program to be performed by the number of software kernels;
compute, based, at least in part, on the set of dependencies and the iteration domains, a first affine schedule that includes at least one loop fusion transformation, wherein the first affine schedule is outer-parallel and inner-sequential;
determine a second affine schedule by applying one or more optimizations to the first affine schedule; and
generate executable code for the number of software kernels based, at least in part, on the second affine schedule.

16. The non-transitory computer-readable storage medium of claim 15, wherein the software kernels are associated with the computer program that comprises instructions to compute one or more linear algebra expressions.

17. The non-transitory computer-readable storage medium of claim 15, wherein the software kernels are used to generate executable code that comprises a linear algebra kernel to be used in connection with a processor controlling an autonomous vehicle.

18. The non-transitory computer-readable storage medium of claim 16, wherein the executable instructions further comprise executable instructions that, as a result of being executed by the one or more processors, cause the computer system to:
generate a loop nest for the first affine schedule, wherein the first affine schedule corresponds to a set of hyperplanes and bounds on an iteration domain of the determined iteration domains, wherein an outermost loop of the loop nest lacks a loop carried dependence; and
wherein the executable code of the computer program comprises code that is mapped to be executed in parallel according to an architecture of the one or more processors.

19. The non-transitory computer-readable storage medium of claim 18, wherein the executable code is mapped to be executed in parallel execution across two or more processor thread blocks.

20. The non-transitory computer-readable storage medium of claim 19, wherein the two or more processor thread blocks support shared memory of data so as to perform the parallel execution.

21. The non-transitory computer-readable storage medium of claim 15, wherein the one or more optimizations are applied at a polyhedral level.

* * * * *